US011500202B2

(12) United States Patent
Lee et al.

(10) Patent No.: US 11,500,202 B2
(45) Date of Patent: Nov. 15, 2022

(54) HEAD MOUNTED DEVICE

(71) Applicant: Samsung Electronics Co., Ltd, Suwon-si (KR)

(72) Inventors: Sang Chui Lee, Guri-si (KR); Doorae Kim, Seongnam-si (KR); Jeisung Park, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 16/606,733

(22) PCT Filed: Apr. 16, 2018

(86) PCT No.: PCT/KR2018/004380
§ 371 (c)(1),
(2) Date: Oct. 18, 2019

(87) PCT Pub. No.: WO2018/194325
PCT Pub. Date: Oct. 25, 2018

(65) Prior Publication Data
US 2020/0409150 A1    Dec. 31, 2020

(30) Foreign Application Priority Data

Apr. 19, 2017 (KR) .......................... 10-2017-0050296

(51) Int. Cl.
*G02B 27/01* (2006.01)
(52) U.S. Cl.
CPC ..... *G02B 27/0172* (2013.01); *G02B 27/0176* (2013.01); *G02B 2027/015* (2013.01);
(Continued)
(58) Field of Classification Search
CPC ............ G02B 27/0172; G02B 27/0176; G02B 2027/0152; G02B 2027/0178;
(Continued)

(56) References Cited

U.S. PATENT DOCUMENTS 5,880,773 A * 3/1999 Suzuki .................... G02B 7/12
348/115
10,330,887 B2 * 6/2019 Bristol .................. G02B 30/34
(Continued)

FOREIGN PATENT DOCUMENTS

CN          104880823 A    9/2015
JP           3172407 B2    6/2001
(Continued)

OTHER PUBLICATIONS

Translated CN-104880823-A (Year: 2015).*
International Search Report dated Jul. 27, 2018 in connection with International Patent Application No. PCT/KR2018/004380, 2 pages.
Written Opinion of the International Searching Authority dated Jul. 27, 2018 in connection with International Patent Application No. PCT/KR2018/004380, 5 pages.
(Continued)

*Primary Examiner* — Thomas K Pham
*Assistant Examiner* — Henry A Duong

(57) ABSTRACT

A head mounted display, according to various embodiments of the present disclosure, comprises: a housing comprising an opening part; an lens assembly arranged in the opening part; and a light shielding part arranged along the circumference of the opening part, wherein the light shielding part may be in a first configuration of being drawn out from the housing via the opening part so as to enable being worn on the face of a user, and a second configuration of having at least one portion thereof inserted into the housing via the opening part.

18 Claims, 22 Drawing Sheets

(52) U.S. Cl.
CPC .............. *G02B 2027/0152* (2013.01); *G02B 2027/0178* (2013.01)

(58) Field of Classification Search
CPC .............. G02B 2027/0132; G02B 7/02; G02B 27/01; G02B 27/0101; G02B 27/0103; G02B 27/0149; G02B 27/017; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
See application file for complete search history.

(56) References Cited

U.S. PATENT DOCUMENTS

| | | | |
|---|---|---|---|
| 2014/0157496 A1* | 6/2014 | Ginther | A61F 9/029 2/439 |
| 2015/0212323 A1 | 7/2015 | Kobayashi et al. | |
| 2015/0253574 A1 | 9/2015 | Thurber | |
| 2016/0054802 A1 | 2/2016 | Dickerson et al. | |
| 2016/0210782 A1 | 7/2016 | Thomas | |
| 2016/0267715 A1 | 9/2016 | Patel | |
| 2016/0341953 A1 | 11/2016 | Tseng et al. | |
| 2016/0349509 A1 | 12/2016 | Lanier et al. | |
| 2016/0349836 A1 | 12/2016 | Goossens et al. | |
| 2017/0013950 A1 | 1/2017 | Rieger | |
| 2017/0031164 A1 | 2/2017 | Costa et al. | |
| 2017/0031165 A1 | 2/2017 | Costa et al. | |
| 2020/0319469 A1* | 10/2020 | Min | H04M 1/0254 |

FOREIGN PATENT DOCUMENTS

| | | |
|---|---|---|
| JP | 2017-022657 A | 1/2017 |
| KR | 10-2016-0023545 A | 3/2016 |
| KR | 10-1697459 B1 | 1/2017 |

OTHER PUBLICATIONS

Notice of Preliminary Rejection dated Oct. 13, 2021 in connection with Korean Patent Application No. 10-2017-0050296, 19 pages.
Korean Intellectual Property Office, "Notice of Final Rejection," dated Apr. 26, 2022, in connection with Korean Patent Application No. 10-2017-0050296, 8 pages.

* cited by examiner

HEAD MOUNTED DEVICE

CROSS-REFERENCE TO RELATED APPLICATIONS

This application is a 371 of International Application No. PCT/KR2018/004380 filed on Apr. 16, 2018, which claims priority to Korean Patent Application No. 10-2017-0050296 filed on Apr. 19, 2017, the disclosures of which are herein incorporated by reference in their entirety.

BACKGROUND

1. Field

The disclosure relates to a head mounted device (HMD).

2. Description of Related Art

When human beings view the world through another medium, the desire to view something with a feeling that is similar to that of the reality has unceasingly increased. In reflection of this desire, technologies for manufacturing virtual reality (VR) contents have recently developed. A representative virtual reality device that provides the user with such virtual reality contents is a head mounted device (hereinafter, an HMD). The HMD is a display device, which as the name implies, is mounted on a user's head. Unlike a TV or a monitor laid on a desk or in a living room, or a large-scale screen that can be seen in a movie theater or the like, if the HMD provided with a small display is mounted on a user's head, the user can experience as if he or she is viewing a huge screen, through the display in front of his or her eyes.

The HMD for reproducing virtual reality contents provides a vivid virtual reality experience to a user by fixing the display close to the eyes of the user and expanding the size of the screen viewed by the user through a lens between the eyes and the display to make the user feel more deeply immersed. The HMD for providing the function requires physical spaces, that is, a space between the lens and the display and a space between the lens and the eyes of the user. In order to satisfy the hardware restrictions, the conventional HMD is realized with a hard structure having a predetermined volume. The HMDs have considerable weights and volumes and have ventilation problems, thus causing the lenses to become fogged due to user perspiration. Further, the weights of the conventional HMDs may become heavier and the volumes of the HMDs may become larger when the displays and other hardware or separate computing devices are embedded in the HMDs. Accordingly, the conventional HMDs cause fatigue when the user carries or wears the HMDs, and it is impossible to use the HMD devices for a long time.

The disclosure provides an HMD which has a reduced weight and a reduced volume by improving a hardware restriction. The disclosure also provides an HMD which prevents a lens from becoming fogged due to user perspiration using a ventilating material.

That is, the HMD according to various embodiments of the disclosure also has a light weight and a small volume, and has ventilation as compared with the conventional HMD.

Meanwhile, other objects that are not explicitly described in the disclosure can be additionally considered without departing from a range that may be easily inferred from the detailed description and the advantageous effects of the disclosure.

SUMMARY

In accordance with an aspect of the disclosure, a head mounted device including a housing including an opening, a lens assembly disposed in the opening, and a light shielding part disposed along a circumference of the opening, wherein the light shielding part is configured to have a first configuration in which the light shielding part is extracted from the housing through the opening to be mounted on the face of a user, and a second configuration in which at least a portion of the light shielding part is inserted into the housing through the opening.

In accordance with another aspect of the disclosure, a head mounted device includes a housing including an opening, a lens assembly disposed in the opening, and a light shielding part, wherein the light shielding part includes a face adhering part having a shape corresponding to a circumference of the opening and a predetermined width, a first light shielding member connecting an outer circumference of the face adhering part and a circumference of the opening, and a second light shielding member connecting an inner circumference of the face adhering part and an outer circumference of the lens assembly, and wherein the face adhering part is configured to have a curved shape to be mounted on the face of the user in the first configuration, and is configured to be bent and deformed in the curved shape in the second configuration to be secured at the circumference of the opening.

The HMD according to various embodiments of the disclosure includes a housing in which a structure for shielding light in a space between the eyes of a user and a lens by using a soft material is included, thereby remarkably reducing the volume and the weight of the HMD and providing the HMD with a portability and ease of mounting.

The HMD according to various embodiments of the disclosure can give a moisture preventing effect to a lens by using ventilation of a soft material.

The HMD according to various embodiments of the disclosure can incidentally obtain an esthetic effect by reducing the volume thereof, and can contribute to the popularization of virtual reality contents by having remarkably enhanced portability.

Effects which can be acquired by the disclosure are not limited to the above described effects, and other effects that have not been mentioned may be clearly understood by those skilled in the art from the following description.

DETAILED DESCRIPTION

Figure 1:
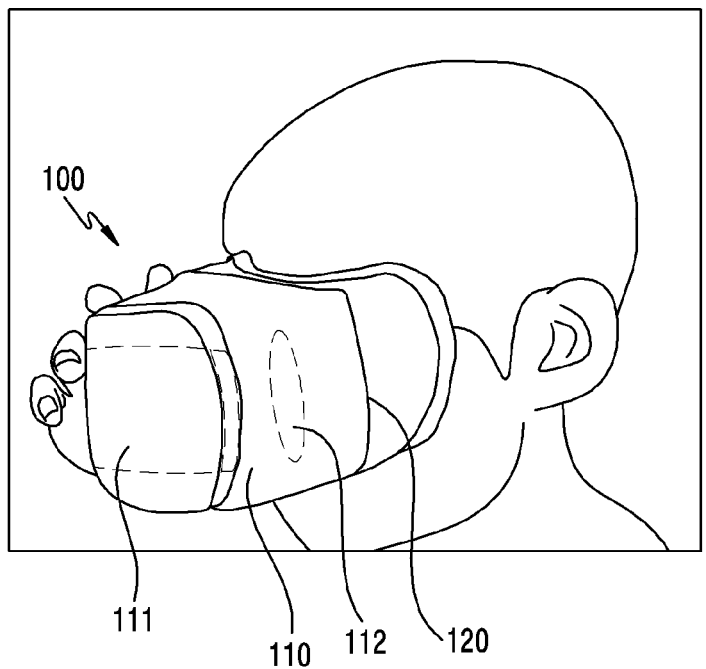
FIG. 1 illustrates an example of using an HMD according to various embodiments of the disclosure.

Hereinafter, various embodiments of the disclosure will be described with reference to the accompanying drawings. However, it should be understood that there is no intent to limit the disclosure to particular forms, and the disclosure should be construed to cover all modifications, equivalents, and/or alternatives falling within the spirit and scope of the embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the disclosure may modify various components regardless of the order and/or the importance but does not limit the corresponding components. The above-described expressions may be used to distinguish an element from another element. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the disclosure may be exchanged with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical terms and scientific terms, may have the same meaning as commonly understood by a person of ordinary skill in the art to which the disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the disclosure should not be interpreted to exclude embodiments of the disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to some embodiments of the disclosure may be a flexible device. Further, the electronic device according to an embodiment of the disclosure is not limited to the aforementioned devices, and may include a new electronic device according to the development of technology.

Hereinafter, various embodiments will be described in detail with reference to the accompanying drawings. Meanwhile, the scales of the elements may be exaggerated or contracted in the drawings for convenience of description. For example, because the scales and thicknesses of the elements illustrated in the drawings are arbitrarily provided for convenience of description, the disclosure is not necessarily limited to the illustrated ones.

Further, a Cartesian coordinate system is used, in which the x-axis direction indicates the transverse direction of an electronic device, the y-axis direction indicates the longitudinal direction of the electronic device, and the z-axis direction indicates the thickness direction of the electronic device. However, the x axis, the y axis, and the z axis may not be limited to three axes of the Cartesian coordinate system, and may be construed as wide meanings including the case. For example, the x axis, the y axis, and the z axis may be perpendicular to each other, but may refer to different directions that are not perpendicular to each other.

FIG. 1 illustrates an example of using an HMD according to various embodiments of the disclosure.

Referring to FIG. 1, the HMD 100 according to various embodiments of the disclosure may include a housing 110 and a light shielding part 120.

The housing 110 may include a display 111 and a lens part 112. The display 111 may display virtual reality contents. The display 111 may be provided by an external electronic device. The external electronic device may be coupled in conjunction with the HMD in a scheme in which it is inserted into and secured to the HMD 100. This manner may be referred to as a drop-in scheme. The external electronic device, for example, may include a smartphone and a tablet. In another embodiment, the display 111 may be mounted on the housing 110 to be embedded in the HMD 100.

A user can put on the HMD 100 and experience a virtual reality. For example, the user can put on the HMD 100 whiling directly carrying the HMD 100 such that the HMD 100 faces or is close to the face of the user so that the display 111 may be viewed through the lens part 112. Further, although not illustrated, a mounting part (e.g., headgear, a hair band, or an eyeglass frame) that may secure the HMD 100 to the head of the user even if the user does not directly carry the HMD 100 may be further provided. The user can experience virtual reality in a three-dimensional (3D) environment through virtual reality contents displayed on the display 111 viewed through the lens part 112 while being expanded (or distorted). In order to realize the technology, physical spaces, for example, a space between the display 111 and the lens part 112 and a space between the lens part 112 and the eyes of the user may be necessary. According to various embodiments of the disclosure, the housing 110 may provide the space between the display 111 and the lens part 112, and the light shielding part 120 may provide a space between the lens part 112 and the eyes of the user. Further, the spaces may be designed to be shielded from external light. The displayed virtual reality contents provide a virtual reality in all fields of view of the user, and this is because the user can be less immersed in the virtual reality if another light other than the light emitted by the display 111 interferes. That is, the housing 110 may have a structure that shields the space between the display 111 and the lens part 112 from light, and the light shielding part 120 may have a structure that shields the space between the lens part 112 and the eyes of the user from light. In detail, the light shielding part 120 may have a predetermined suitable shape designed to be adhered to the facial surface of the user while defining a surface extending from a side surface of the housing 110. The light shielding part 120 may provide an enhanced virtual reality experience to the user by maximizing a screen effect (a movie theater environment).

In order to provide virtual reality contents, a structure that shields light with a predetermined physical space is necessary. The HMD 100 according to various embodiments may provide the physical space and the light shielding structure through the housing 110 and the light shielding part 120. Further, according to various embodiments, because at least a portion of the light shielding part 120 is inserted into the housing 110, thereby reducing the volume of the HMD 100 while the user is not using the HMD 100, an HMD 100, of which the esthetic aspect as well as the portability and the ease of keeping is incidentally enhanced, can be provided.

Figure 2A:
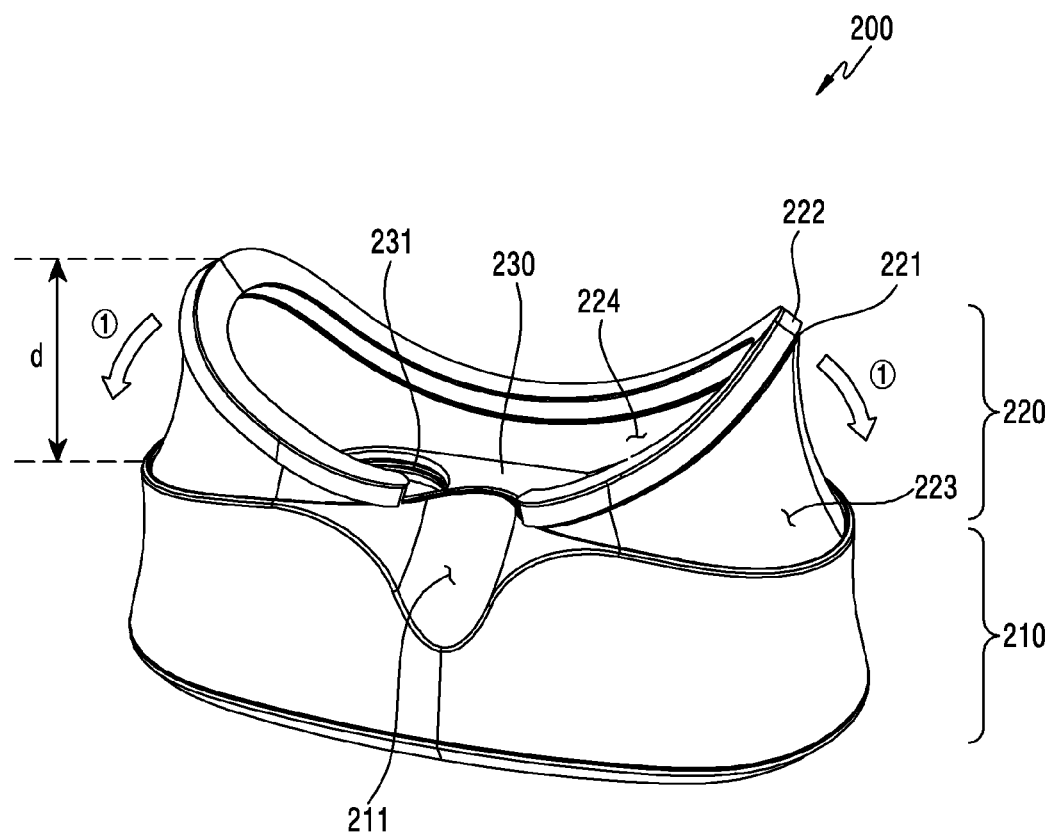
FIG. 2A is a perspective view illustrating a first use configuration of an HMD according to various embodiments of the disclosure.
Figure 2B:
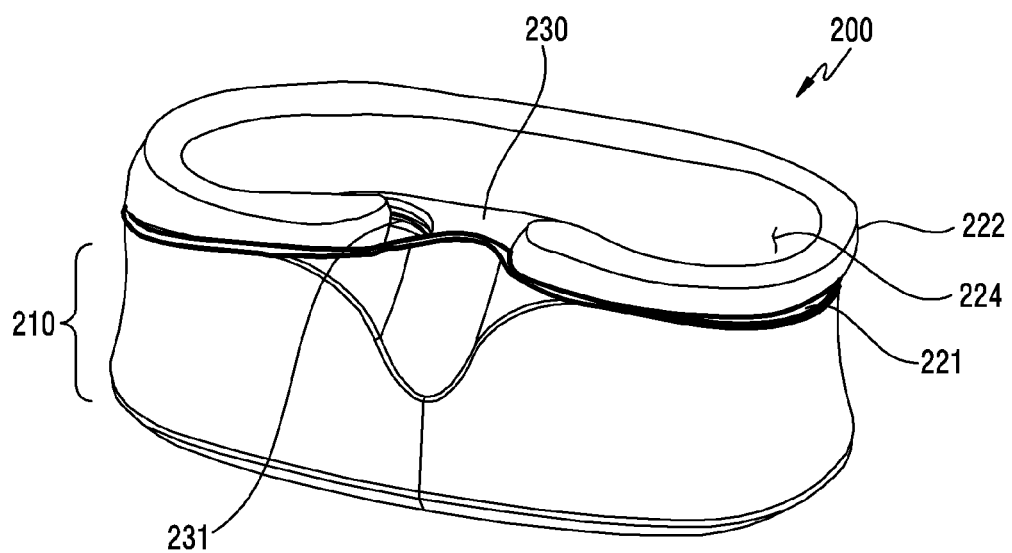
FIG. 2B is a perspective view illustrating a second use configuration of the HMD according to various embodiments of the disclosure.

FIG. 2A is a perspective view illustrating a first use configuration of an HMD according to various embodiments of the disclosure. FIG. 2B is a perspective view illustrating a second use configuration of the HMD according to various embodiments of the disclosure.

Referring to FIG. 2A, the HMD 200 according to various embodiments of the disclosure may include a housing 210, a light shielding part 220, and a lens assembly 230. The housing 210 may be formed in a tube shape having a substantially elliptical cross-section to provide an interior space in which various components of the HMD 200 are assembled. A partial area of the housing 210 may further include a shape 211 of a nose-seating part in which the nose of the user may be seated when the user puts on the HMD 200. The lens assembly 230 may be disposed in an opening on an upper surface of the housing 210. The lens assembly 230 includes at least one converging lens 231, and the at least one converging lens 231 may be configured to provide the user with a virtual reality experience by enlarging (or distorting) the virtual reality contents displayed on the display (not illustrated) secured to and disposed on the bottom surface of the housing 210. Then, the housing 210 may shield the space between the display (not illustrated) and the lens assembly 230 from light.

According to various embodiments of the disclosure, the light shielding part 220 may include a face contact part 221, face foam 222, a first light shielding member 223, and a second light shielding member 224. The face contact part 221 may be formed to have a predetermined width in a shape corresponding to the housing 210. The first light shielding member 223 may connect the face contact part 221 and the circumference of an opening of the housing 210. The first light shielding member 223 may define the outer surface of the HMD 200 together with the housing 210. Further, the second light shielding member 224 may connect the face contact part 221 and the outer circumference of the lens assembly 230. The second light shielding member 224 may define the inner surface of the HMD 200 together with the lens assembly 230. The first light shielding member 223 and the second light shielding member 224 are elements that define the external appearance of the HMD 200, and may have a screen function of shielding the interior of the HMD 200 from external light. In other words, the first light shielding member 223 and the second light shielding member 224 may have a light shielding function of shielding the space between the lens assembly 230 and the eyes of the user from light. Further, the first light shielding member 223 and the second light shielding member 224 are elements that determine the external appearance of the HMD 200, and may have a function of protecting internal components.

Referring to FIG. 2A, the face contact part 221 according to various embodiments of the disclosure may be configured to have a curved shape such that the HMD 200 is adhered to the facial shape of the user when the first HMD 200 is in the first configuration (e.g., the user puts on and uses the HMD 200). For example, the curved shape may include a shape in which opposite sides of an intermediate portion of the face contact part 221 is bent and deformed in a direction that faces the outside of the housing 210. Referring to FIG. 2B, the face contact part 221 according to various embodiments may be configured to be secured to the circumference of the housing 210 when the HMD 200 is in the second configuration (e.g., when the HMD 200 is not used). The opposite sides of the face contact part 221 with respect to the intermediate portion of the face contact part 221 may be bent and deformed in a direction (the arrow direction) that faces the housing 210 and may be secured to the circumference of the housing 210 when the first configuration is changed to the second configuration. That is, the user may change the HMD 200 in the first configuration (FIG. 2A) to the HMD 200 in the second configuration (FIG. 2B) by pressing opposite sides of the face contact part 221 in the arrow direction. To achieve this, the face contact part 221 may be formed of a material having a sufficient durability and a sufficient elasticity for bending and deformation, for example, plastic or a metallic material.

According to various embodiments of the disclosure, the face foam 222 may be disposed along most of the areas of the face contact part 221 in a direction that contacts the face of the user. The face foam 222 may be formed of a porous material having an elastic or cushioning property, for example, a material such as sponge or rubber. Accordingly, the face foam 222 may be bent and deformed as the face contact part 221 is bent and deformed according to the change of the configuration of the HMD 200. Further, the face foam 222 can enhance the screen effect by adhering the face of the user and the HMD 200 without a gap when the user puts on the HMD 200, and the user may be provided with less obtrusive usability. Accordingly, the light shielding part 220 may be referred to as 'a face adhering part' or 'a mounting part'.

According to various embodiments of the disclosure, as the configuration of the HMD 200 is changed from the first configuration to the second configuration, at least a portion of the light shielding part 220 may be inserted into the housing 210. Further, as the configuration of the HMD 200 is changed from the second configuration to the first configuration, at least a portion of the light shielding part 220 may be extracted from the housing 210. For example, the first light shielding member 223 and the second light shielding member 224 of the light shielding part 220 may be configured to be inserted into and extracted from the housing 210. Accordingly, the HMD 200 according to various embodiments may be provided to have a smaller volume in the second configuration as compared with the first configuration. For example, the HMD 200 may have a volume that is smaller by a difference (d) from the highest height in the first configuration in which the face contact part 221 has a curved shape to the height of the opening of the housing 210. Therefore, the user can easily carry and keep the HMD 200 in the second configuration, which has a decreased volume.

According to various embodiments of the disclosure, the first light shielding member 223 and the second light shielding member 224 may be formed of a material having an elastic, flexible, and ventilating property. For example, the second light shielding member may be a material of a soft fabric such as spandex. Because the first light shielding member 223 and the second light shielding member 224 have elasticity and flexibility, they may be spread out and be extracted from the housing 210 when the HMD 200 is in the first configuration, and may be folded and be inserted into the housing 210 when the HMD 200 is in the second configuration. Because the first light shielding member 223 and the second light shielding member 224 are made of a relatively light soft fabric material, the weight of the HMD 200 can become lighter and the ease of portability and keeping can be enhanced. Further, the first light shielding member 223 and the second light shielding member 224 may have various colors and patterns, and may include various objects. The various objects, for example, may be printing of an advertisement wording, a product name, a brand, or the like. Accordingly, the HMD 200 in the second configuration may further visually have an esthetic aspect and a product value.

According to the features of the HMD 200 of various embodiments of the disclosure, the structure for inserting or extracting at least a portion of the light shielding part of the HMD 200 may be defined as a structure that may be opened and closed, or a structure that may be unfolded and folded. Further, the first configuration of the HMD 200 may be referred to as a usage configuration, an open configuration, or a spread configuration. Further, the second configuration of the HMD 200 may be variously referred to as a non-usage configuration, a close configuration, a folded configuration, a shipping configuration, or a portable configuration.

Figure 3A:
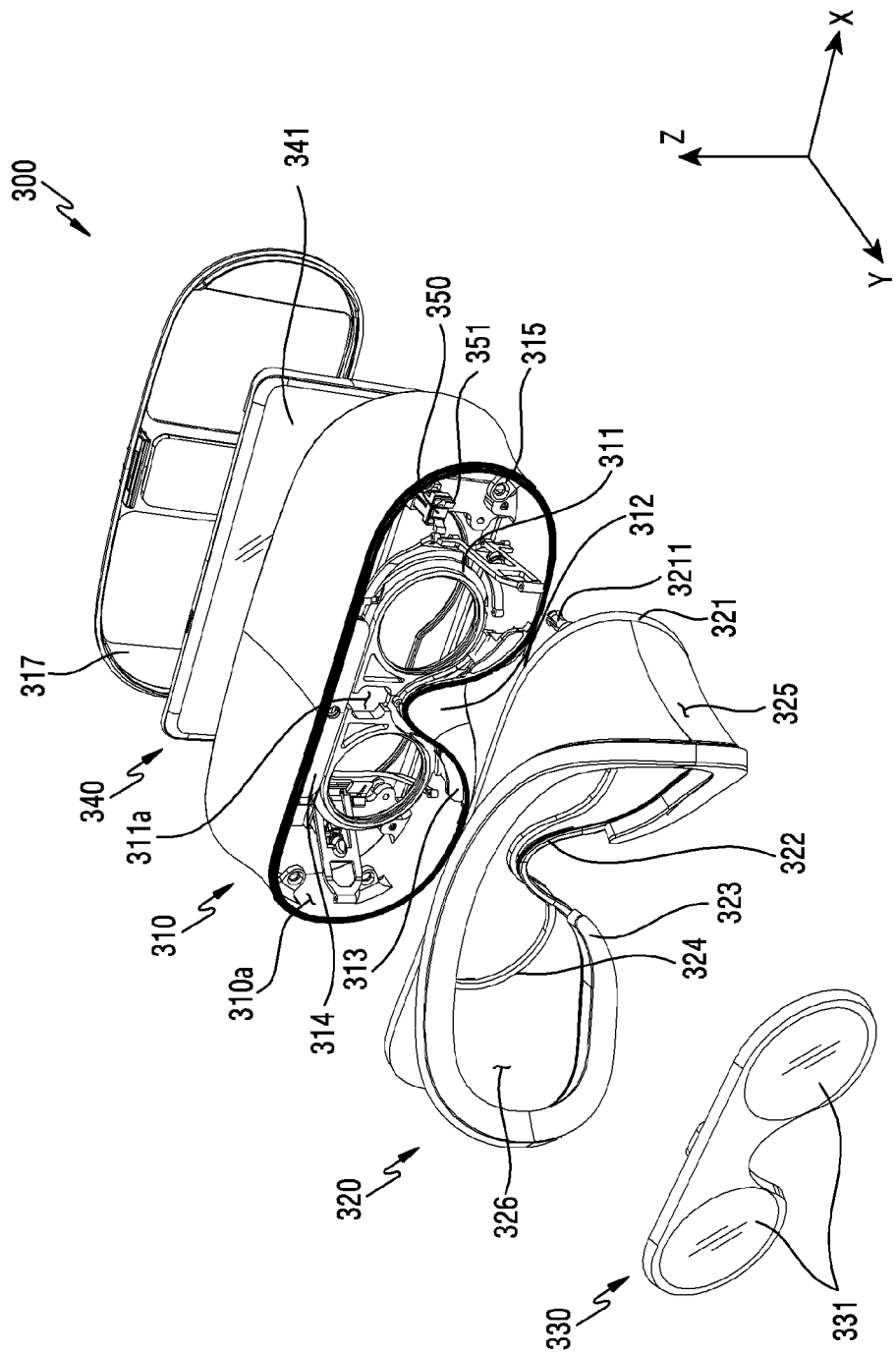
FIG. 3A is an exploded perspective view illustrating the first use configuration of the HMD according to various embodiments of the disclosure.
Figure 3B:
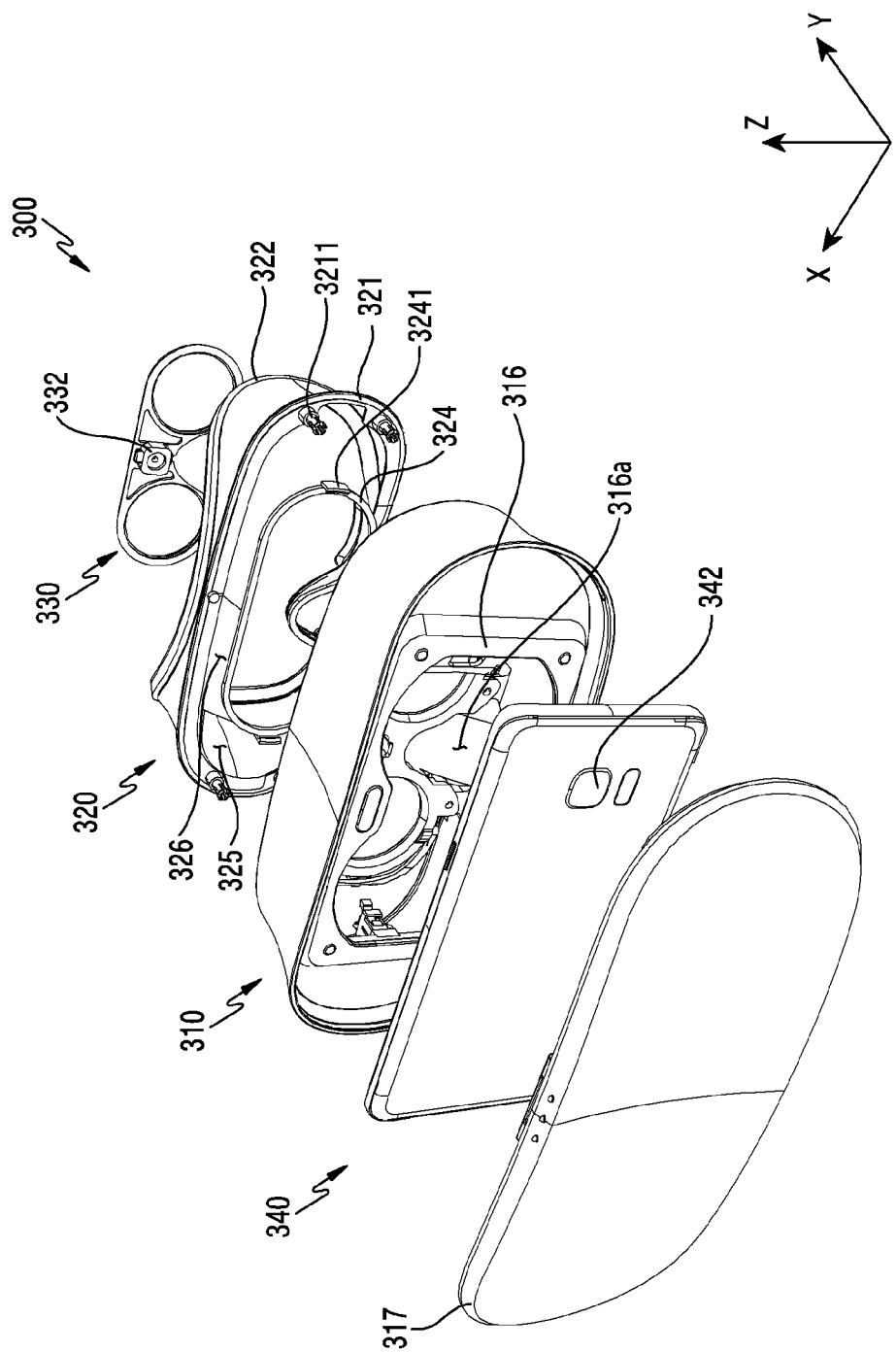
FIG. 3B is an exploded perspective view illustrating the second use configuration of the HMD according to various embodiments of the disclosure.

FIG. 3A is an exploded perspective view illustrating the first use configuration of the HMD according to various embodiments of the disclosure. FIG. 3B is an exploded perspective view illustrating the second use configuration of the HMD according to various embodiments of the disclosure. The HMD 300 disclosed in FIGS. 3A and 3B may be a device that is similar to or the same as the HMD 200 disclosed in FIG. 2A or FIG. 2B. A detailed description of the configuration that is the same as or similar to the configuration described in FIG. 2A or FIG. 2B may be omitted.

Referring to FIGS. 3A and 3B, the HMD 300 according to various embodiments of the disclosure may include a housing 310, a light shielding part 320, and a lens assembly 330. The housing 310 may include a shape, of which the front surface and the rear surface are at least partially opened. For example, the housing 310 may include a side surface that has a substantially elliptical cross-section and surrounds a space between the front surface and the rear surface. The housing 310 may include a front surface in a direction (+y) in which a front cover 317 is disposed and a rear surface in a direction (−y) in which the light shielding part 320 is disposed.

According to various embodiments of the disclosure, the front surface of the housing 310 may include a seating part 316 that provides a mounting space, into which an external electronic device 340 including a display 241 may be inserted to be secured. The seating part 316 may include a display opening 316a. The external electronic device 340 may be mounted such that the display 341 faces the display opening 316a. The external electronic device 340 may display virtual reality contents or a virtual reality application. The user may experience a virtual reality through a converging lens 331 provided in the lens assembly 330. The front cover 317 may be coupled to cover an opened surface of the front surface of the housing 310. The front cover 317 may be separated from the housing 310 through separation of a coupling mechanism (e.g., hook or loop locking). The front cover 317 functions to shield external light by covering the opened surface of the front surface of the housing 310, to stably support securing of the external electronic device 340, and to protect the external device 340. In another embodiment, although not illustrated, the front cover 317 may further include a camera aperture at a location corresponding to an imaging device 342 disposed on the rear surface of the external electronic device 340. The external electronic device 340 may acquire an external image after separating the front cover 317 or without separating the external electronic device 340, through the camera aperture.

The housing 310 according to various embodiments of the disclosure may include an opening 310a on a rear surface thereof. The housing 310 may include various structures in the interior thereof. For example, a first lens mount part 311 may be disposed at an intermediate portion of the housing 310. A first support part 313 may be disposed at an upper portion of the inside of the opening 310a. Second support parts 314 may be disposed on opposite sides of a lower portion of the inside of the opening 310a with respect to a nose seating part 312. Further, at least one coupling boss accommodating hole 315 may be disposed on an inner surface of the opening 310a. Further, the housing 310 may further include a joint structure 360 for realizing an insertion/extraction mechanism of the light shielding part 320, and a locker 370 according to various embodiments. The joint structure 360 for the insertion/extraction mechanism and the locker 370 will be described in detail later.

According to various embodiments of the disclosure, the light shielding part 320 may include a face contact part-pair member 321, a face contact part 322, face foam 323, a second lens mount part 324, a first light shielding member 325, and a second light shielding member 326. The face contact part-pair member 321 and the face contact part 322 may be formed to have a predetermined width in a shape corresponding to the opening 310a of the housing 310. The first light shielding member 325 may be disposed between the face contact part-pair member 321 and the face contact part 322 to connect the outside of the face contact part-pair member 321 and the outside of the face contact part 322.

According to various embodiments of the disclosure, the second light shielding member 326 may be disposed between the face contact part 322 and the second lens mount part 324 to connect the inside of the face contact part 322 and the outside of the second lens mount part 324. The second lens mount part 324 may have a shape corresponding to the first lens mount part 311 of the housing 310. When the housing 310 and the light shielding part 320 are coupled to each other, the first lens mount part 311 and the second lens mount part 324 may be coupled to each other to face each other. According to various embodiments, the lens assembly 330 may be mounted to the first lens mount part 311 and the second lens mount part 324. For example, the first lens mount part 311 may include a lens assembly accommodating part 311a, and the lens assembly 330 may include a coupling protrusion 332 corresponding to the lens assembly accommodating part 311a as a coupling unit.

According to various embodiments of the disclosure, the face contact part-pair member 321 may include at least one coupling boss 3211 that protrudes in a direction that faces the housing 310. The coupling bosses 3211 may be disposed at locations corresponding to the coupling boss accommodating holes 315 of the housing 310. The light shielding part 320 may be secured to the housing 310 through coupling of the coupling bosses 3211 and the coupling boss accommodating holes 315. Accordingly, the first light shielding member 325 may be defined as connecting the face contact part 322 and the circumference of the opening 310a of the housing 310 when the light shielding part 320 and the housing 310 are secured and coupled to each other. Further, the first light shielding member 325 may be defined as defining the outer surface of the HMD 300 together with the housing 310.

According to various embodiments of the disclosure, the second lens mount part 324 may be secured and coupled to the first lens mount part 311 of the housing 310 by a coupling unit. For example, the second lens mount part 324 may be assembled with the first lens mount part 310 to be separable through a hook or loop locking structure. In detail, the second lens mount part 324 may further include a hook 3241 that faces the housing 310. Accordingly, the hook 3241 may be coupled to the second lens mount part 311 in a scheme in which the hook 3241 is hooked by the outer surface of the first lens mount part 311. When the light shielding part 320 and the housing 310 are secured and coupled to each other and the lens assembly 330 is coupled to the first and second lens mount parts 311 and 324, the second light shielding member 325 may be defined as connecting the face contact part 322 and the lens assembly 330. Further, the second light shielding member 325 may be defined as defining the inner surface of the HMD 300 together with the lens assembly 330. According to an embodiment, the face foam 323 may be disposed along most of the areas of the face contact part 221 in a direction that contacts the face of the user. The face foam 323 is formed of a material having elasticity and may be bent and deformed as the face contact part 221 is bent and deformed according to the change of the configuration of the HMD 300.

Figure 4:
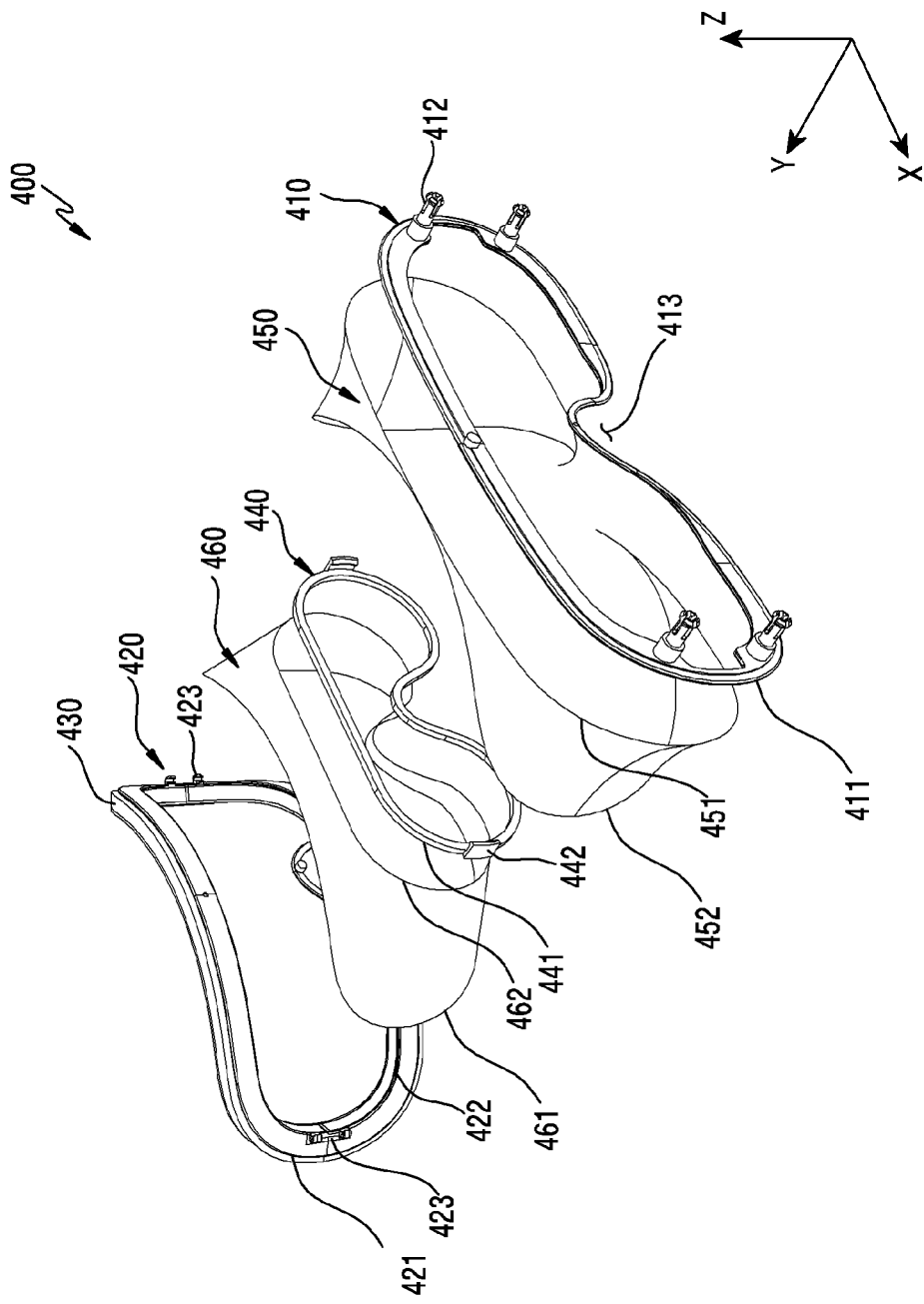
FIG. 4 illustrates an exploded perspective view of a light shielding part according to various embodiments of the disclosure.

FIG. 4 illustrates an exploded perspective view of a light shielding part according to various embodiments of the disclosure. The light shielding part 400 disclosed in FIG. 4 may have a configuration that is similar to or the same as the light shielding part 320 disclosed in FIG. 3A. A detailed description of the configuration that is the same as or similar to the configuration described in FIG. 3A may be omitted.

Referring to FIG. 4, according to various embodiments of the disclosure, the light shielding part 400 may include a face contact part-pair member 410, a face contact part 420, face foam 430, a second lens mount part 440, a first light shielding member 450, and a second light shielding member 460. The face contact part-pair member 410 and the face contact part 420 may be formed to have a predetermined width in a shape corresponding to the opening (e.g., the opening 310a of FIG. 3A) of the housing 310. According to an embodiment, the first light shielding member 450 may connect the outside 411 of the face contact part-pair member 410 and the outside 421 of the face contact part 420. For example, a first side 451 of the first light shielding member 450 may be secured and coupled to the outside 411 of the face contact part-pair member 410. Further, a second side 452 of the first light shielding member 450 may be secured and coupled to the outside 421 of the face contact part 420. According to an embodiment, the second light shielding member 460 may connect the face contact part 420 and the second lens mount part 440. For example, a first side 461 of the second light shielding member 460 may be secured and coupled to the inside 422 of the face contact part 420. Further, a second side 462 of the second light shielding member 460 may be secured and coupled to the outside 441 of the second lens mount part 440. That is, one form in which the face contact part-pair member 410, the face contact part 420, and the second lens mount part 440 are structurally supported by the securing and coupling of the first light shielding member 450 and the second light shielding member 460 may be provided to the light shielding part 400. According to another embodiment, the face contact part-pair member 410, the face contact part 420, and the second lens mount part 440 may be disposed to be secured to each other at at least a portion thereof. For example, the face contact part-pair member 410, the face contact part 420, and the second lens mount part 440 may be directly secured and coupled in an area of the nose seating part 413 without a connection by the light shielding member, or may be integrally formed with each other.

According to various embodiments of the disclosure, the face contact part-pair member 410 may include at least one coupling boss 412. The coupling boss 412 may be a coupling unit when being assembled in the housing (e.g., the housing 310 of FIG. 3A). According to various embodiments, the face contact part 420 may include hoops 423 at opposite ends thereof. The first joint loop 423 may be coupled to the joint structure to be rotatable to function to transmit an elastic force in a direction (+y) in which the face contact part 420 maintains the curved shape. Further, the elastic force may be defined as an outwardly pushing force. Further, in various embodiments, face foam 430 may be further disposed along most of the areas of the face contact part 420. The face foam 430 may be formed of a porous material having an elastic or cushioning property, for example, a material such as sponge or rubber to provide a comfortable feeling when being mounted.

Figure 5A:
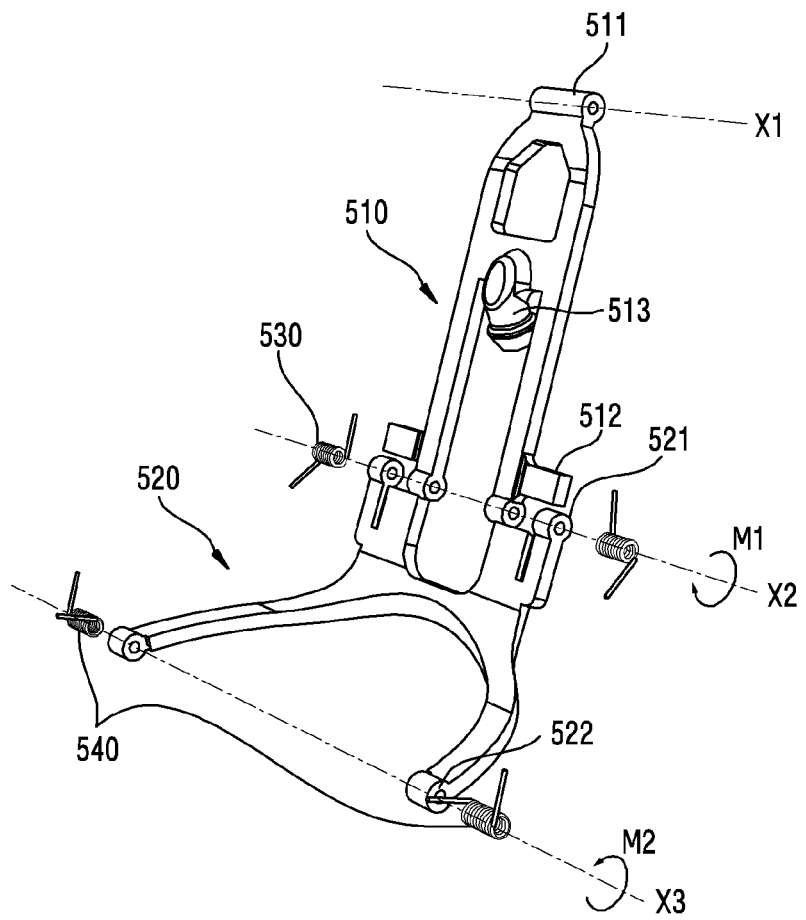
FIG. 5A illustrates an exploded perspective view of a joint structure according to various embodiments of the disclosure.
Figure 5B:
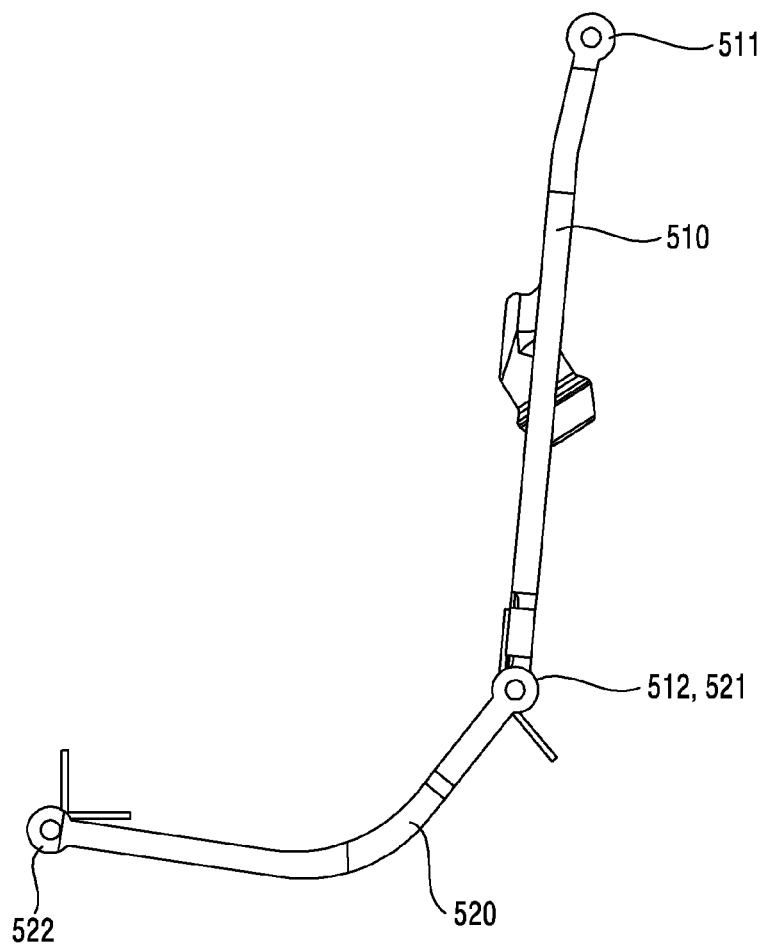
FIG. 5B illustrates a side surface of the joint structure according to various embodiments of the disclosure.
Figure 5C:
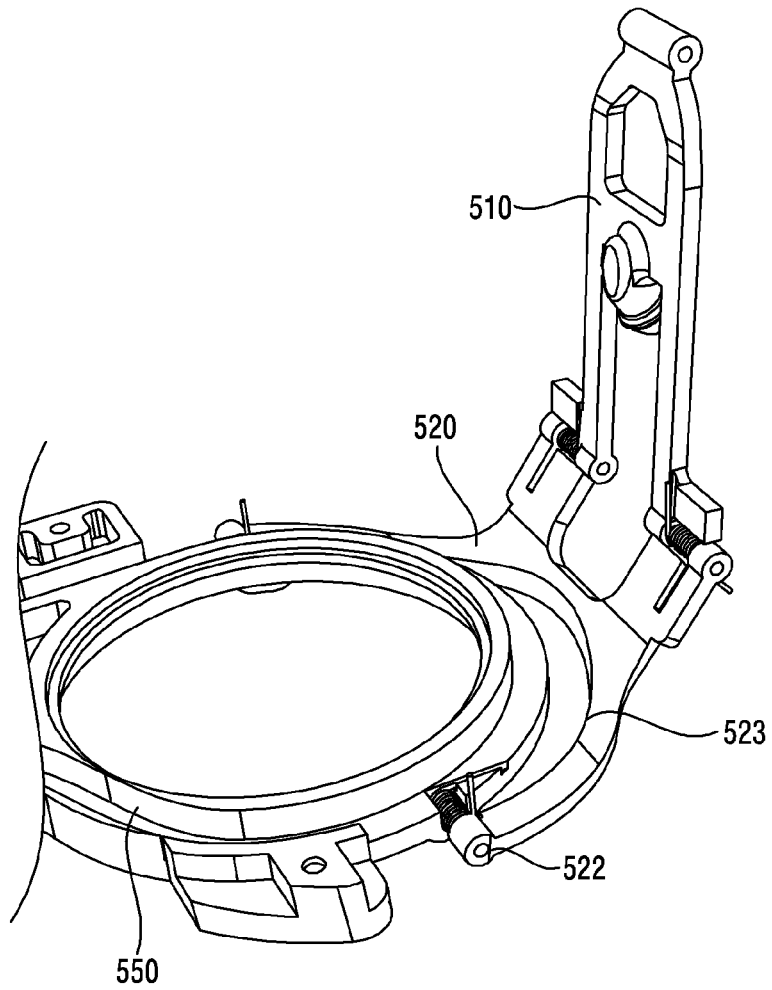
FIG. 5C illustrates an example of a coupling structure of the joint structure according to various embodiments of the disclosure.

FIG. 5A illustrates an exploded perspective view of a joint structure according to various embodiments of the disclosure. FIG. 5B illustrates a side surface of the joint structure according to various embodiments of the disclosure. FIG. 5C illustrates an example of a coupling structure of the joint structure according to various embodiments of the disclosure. The joint structure 500 disclosed in FIGS. 5A to 5C may be similar to or the same as the joint structure 360 disclosed in FIG. 3A. A detailed description of the configuration that is the same as or similar to the configuration described in FIG. 3A may be omitted.

Referring to FIG. 5A, the joint structure 500 according to various embodiments of the disclosure may include a first joint 510 and a second joint 520. The first joint 510 may include a first hinge part 511 and a second hinge part 512 at opposite ends thereof. The second joint 520 may include a third hinge part 521 and a fourth hinge part 522 at opposite ends thereof. The first joint 510 and the second joint 520 may be coupled such that the second hinge part 512 and the third part 521 are rotatable about the second axis X2. For example, the first hinge part 511 of the first joint 510 may be coupled to the hoop (e.g., the hoop 423 of FIG. 4) of the face contact part (e.g., the face contact part 420 of FIG. 4) to be hingeable in the second axis X2. Further, the fourth hinge part 522 of the second joint 520 may be coupled to the first lens mount part 550 to be hingeable in the third axis X3. According to various embodiments, the first axis X1 may freely rotate without using an elastic unit. However, the second axis X2 and the third axis X3 may include an elastic unit to transmit a rotational force in a predetermined direction. For example, the second axis X2 includes a first pin spring 530, and an elastic force of the first pin spring 530 may transmit a first rotational force M1 in the clockwise direction to the first joint 510 and the second joint 520. Further, the third axis X3 includes a second pin spring 540, and an elastic force of the second pin spring 540 may receive a second rotational force M2 in the counterclockwise direction with respect to the first lens mount part from the second joint 520. The rotational forces M1 and M2 may function to transmit an elastic force in a direction (+z) in which the face contact part (e.g., the face contact part 420 of FIG. 4) coupled to the first hinge part 511 maintains the curved shape. The elastic force may be defined as a force that pushes the face contact part outwards. According to another example, the first axis X1 also further includes a pin spring, and may contribute to the elastic force by transmitting a rotational force in the counterclockwise direction.

The first joint 510 according to various embodiments of the disclosure may further include a protrusion 513. The protrusion 513 is stopped by the locker (e.g., the locker 360 of FIG. 3A) included in the housing (e.g., the housing 310 of FIG. 3A) so that the whole motion of the joint structure 500 may be confined. This will be described in detail with reference to FIGS. 6A to 6C.

The joint structure 500 according to various embodiments of the disclosure may be configured to have a shape that does not hamper use of the HMD. For example, the first joint 510 and the second joint 520 of the joint structure 500 may be configured in a shape that does not interfere with the field of view of the user who views the converging lens. Referring to FIG. 5B, the first joint 510 according to various embodiments of the disclosure may be formed to be substantially linear when viewed from a side. For example, the first joint 510 may have a linear shape that extends from the first hinge part 511 to the second hinge part 512. The second joint 520 may have a shape that is substantially bent when viewed from a side. For example, not a linear shape but a shape, an intermediate portion of which is bent, may be formed between the third hinge part 521 and the fourth hinge part 522. Referring to FIG. 5C, the second joint 520 may include a curved portion 523 having a shape that surrounds at least a portion of the first lens mount part 550. The curved portion 523 may be coupled to the first mount part 550 to be rotatable, through the fourth hinge part 522 at an end thereof. Because the second joint 520 has a curved portion 523, the second joint 520 may be configured not to be interfere with the field of view of the user, which faces the converging lens (e.g., the converging lens 331 of FIG. 3A) of the lens assembly (e.g., the lens assembly 330 of FIG. 3A) that may be assembled in the first lens mount part 550 in spite of the rotation of the joint structure 500.

Figure 6A:
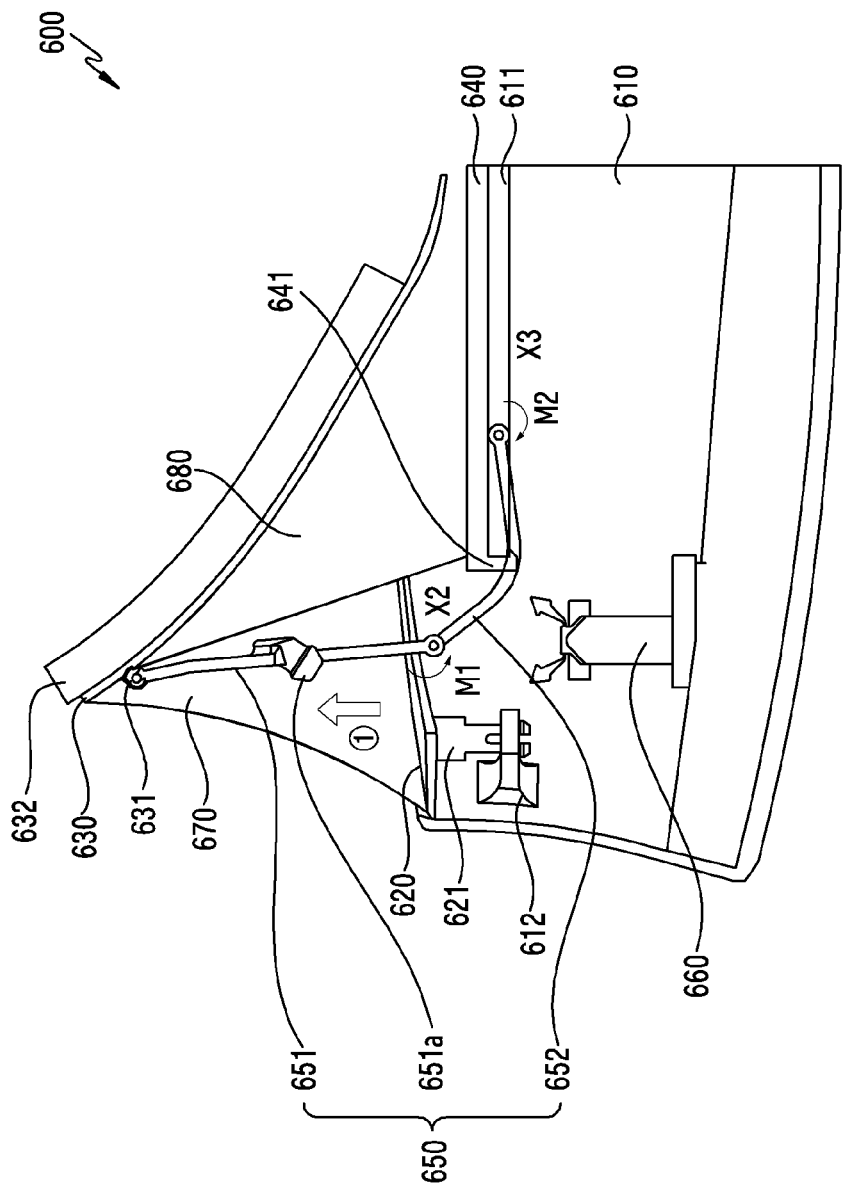
FIG. 6A is a phantom cross-sectional view of the HMD in a first configuration according to various embodiments of the disclosure.

FIG. 6A is a phantom cross-sectional view of the HMD 600 in a first configuration according to various embodiments of the disclosure. FIG. 6C is a phantom cross-sectional view of the HMD 600 in the second configuration according to various embodiments of the disclosure. FIG. 6C is a phantom cross-sectional view of the HMD 600 during an operation of changing the configuration of the HMD 600 between the first configuration and the second configuration according to various embodiments of the disclosure. The HMD 600 disclosed in FIGS. 6A to 6C may be similar to or the same as the HMD 300 disclosed in FIG. 3A. A detailed description of the configuration that is the same as or similar to the configuration described in FIG. 3A may be omitted.

Referring to FIG. 6A, the housing 610 according to various embodiments of the disclosure may include a first lens mount part 611 secured to and disposed in the interior of the housing 610. The housing 610 may be assembled with a light shielding part including a face contact part-pair member 620, a face contact part 630, and a second lens mount 640. The second lens mount 640 may be coupled to the first lens mount 611 by a hook 641 at an end thereof. Further, the face contact part-pair member 620 may be assembled with the housing 610 by coupling of the coupling boss 621 and the coupling boss accommodating hole 612 disposed on the inside of the housing 610.

The joint structure 650 according to various embodiments of the disclosure may be assembled with the first lens mount part 611 and the face contact part 630. For example, one end of the first joint 651 may be coupled to a hoop 631 of the face contact part 630 to be hingeable in the first axis X1, and one end of the second joint 652 may be coupled to the first lens mount part 611 to be hingeable in the second axis X2. Further, an opposite end of the first joint 651 and an opposite end of the second joint 652 may be connected to each other to be hingeable in the third axis X3. The second axis X2 may include an elastic unit, for example, a pin spring, and may have a first rotational force M1 in the counterclockwise direction, which is transmitted by the pin spring. The third axis X3 may include an elastic unit, for example, a pin spring, and may have a second rotational force M2 in the clockwise direction, which is transmitted by the pin spring. Accordingly, an elastic force may be transmitted to an end of the face contact part 630, by the joint structure 650, in a direction (direction ①) in which the end of the face contact part 630 is extracted. That is, the HMD 600 may maintain the first configuration having a curved shape in which the face contact part 630 is bent to opposite sides, by using the joint structure 650. Further, the joint structure 650 may provide an enhanced usability by providing a force, by which the face foam 630 may be adhered to the face of the user, when the user puts on the HMD 600.

According to various embodiments of the disclosure, the HMD 600 may include a locker 660 disposed in the housing 610. The locker 660 may be configured to confine an operation of the joint structure 650. The confinement of the operation of the joint structure 650 may be defined as confining an elastic force in an extraction direction (direction ①). Accordingly, the locker 660 may function to maintain the HMD 600 in the second configuration.

Figure 6B:
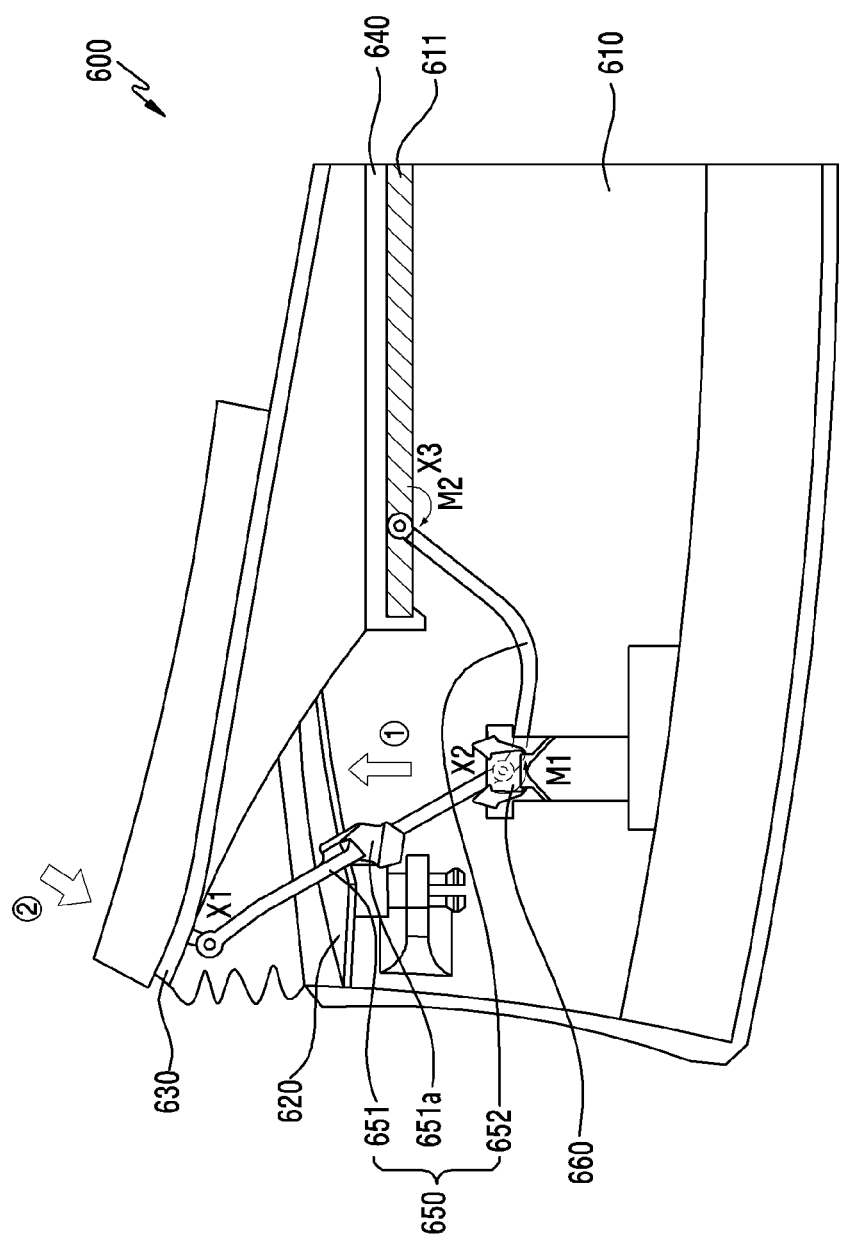
FIG. 6B illustrates a phantom cross-sectional view of the HMD in an intermediate operation of changing a state from the first configuration to a second configuration according to various embodiments of the disclosure.
Figure 6C:
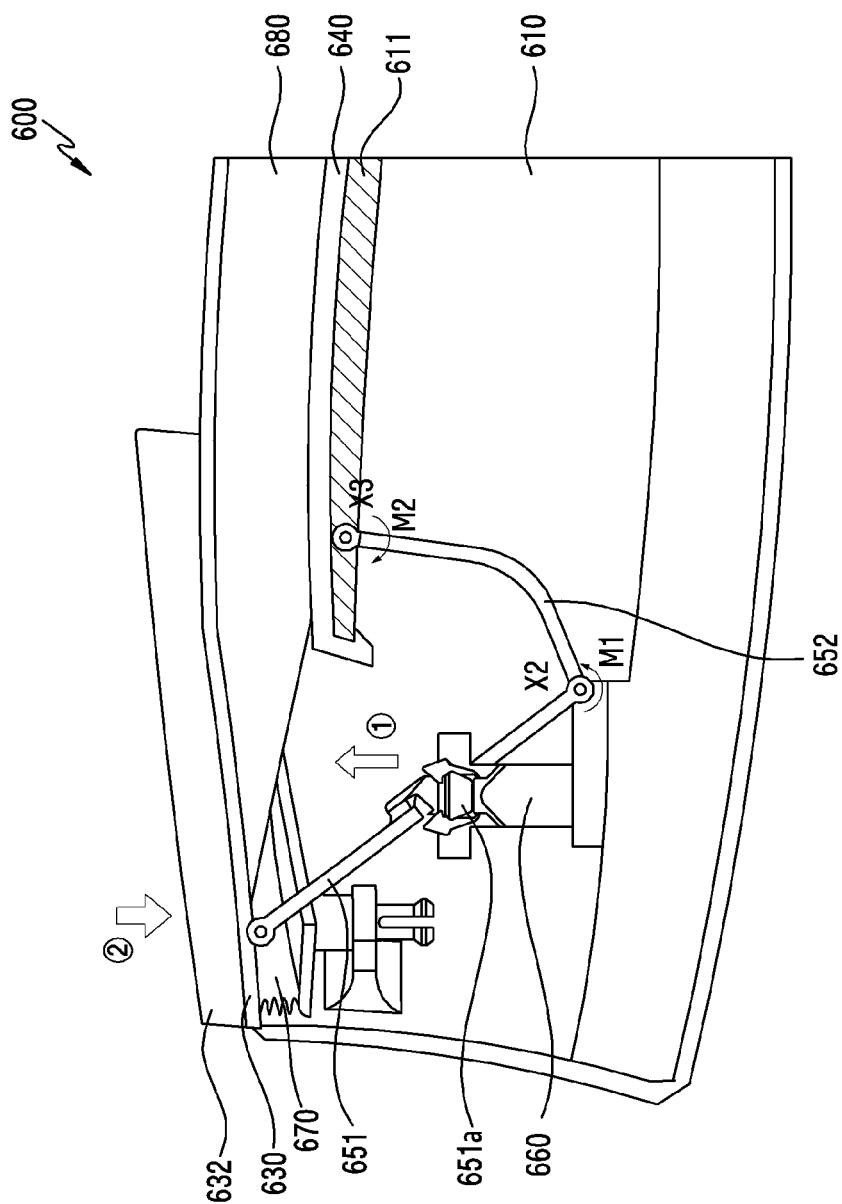
FIG. 6C is a phantom cross-sectional view of the HMD in the second configuration according to various embodiments of the disclosure.

Referring to FIG. 6B, the joint structure 650 may be joint-moved by pressing the face foam 632 or an end of the face contact part 630 by the user. For example, when an external force is applied in a direction (direction ②) in which the face foam 632 or the end of the face contact part 630 is inserted, the face contact part 630 may be bent and deformed toward the housing 610. Accordingly, the second joint 652 may be hinged in the counterclockwise direction about the third axis X3 in spite of the second rotational force M2 in the clockwise direction in the third axis X3. Further, the first joint 651 may be hinged in the clockwise direction with respect to the second joint 652 about the second axis X2 in spite of the first rotational force M1 in the counterclockwise direction in the second axis X2. When the pressing of the external force is stopped in the intermediate process, the HMD 600 may be restored to the first configuration (FIG. 6A) again.

Referring to FIG. 6C, when the HMD 600 is in the second configuration, the face contact part 630 may be bent and deformed from the curved shape in the first configuration (FIG. 6A) to a shape in which the face contact part 630 may be secured to the circumference of the opening on the upper surface of the housing 610. Then, the first light shielding member 670 and the second light shielding member 680 may be formed of an elastic and/or flexible material, and a portion thereof may be inserted into the housing 610.

According to various embodiments, as the joint structure 650 is hinged, the protrusion 651a provided in the first joint 651 may be locked by the locker 660. For example, as the second joint 652 continues to be hinged in the clockwise direction about the third axis X3 and the first joint 651 further is hinged in the clockwise direction about the second axis X2, the protrusion 651a may move in a direction in which the protrusion 651a is inserted into and extracted from the locker 660. The locker 660 may be secured not to move while hooking the protrusion 651a, and through this, the operation of the joint structure 650 may be confined. As a result, the locker 660 may function to maintain the HMD 600 in the second configuration in spite of an elastic force in a pushing direction (direction ①) provided by the elastic units of the joint structure 650. The locker 660, for example, may include a spring lock or a magnet door catch.

According to various embodiments, the HMD 600 in the second configuration may be restored to the first configuration by unlocking the locker 660. The unlocking of the locker 660 may vary according to the type thereof. For example, a scheme (e.g., a magnet door catch) of applying a force of a predetermined degree or more in an extraction direction or a scheme (e.g., a spring lock) of applying a force in a re-insertion direction of a predetermined degree or more may be provided.

Figure 7:
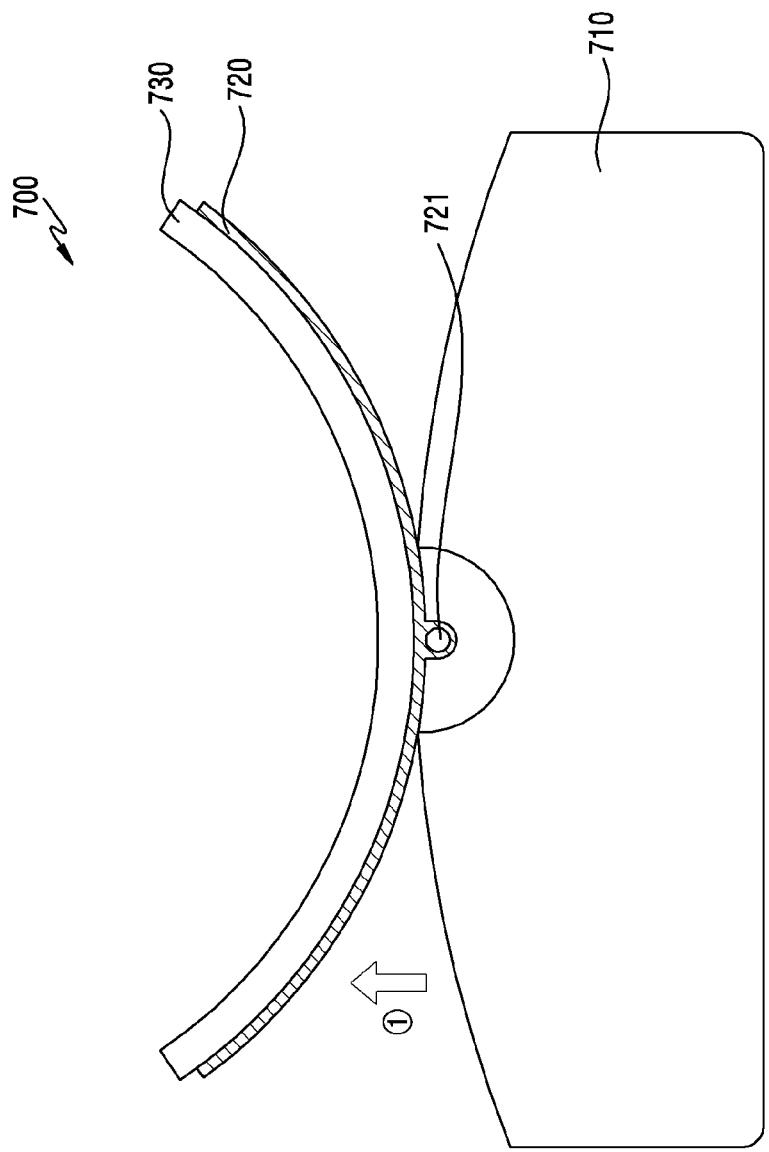
FIG. 7 is a cross-sectional view illustrating the HMD including a face contact member formed of an elastic member according to various embodiments of the disclosure.

FIG. 7 is a cross-sectional view illustrating the HMD including a face contact part formed of an elastic member according to various embodiments of the disclosure.

Referring to FIG. 7, the HMD 700 according to various embodiments of the disclosure may include a housing 710, a face contact part 720, and face foam 730. The face contact part 720 may be integrally formed and be disposed at an intermediate portion of the housing 710 while having a bending axis 721. The face contact part 720 may include a curved shape, opposite ends of which are bent toward the outside about the bending axis 721. Then, the face contact part 720 has to have an elastic force for maintaining the curved shape to give a force, by which the face foam 632 may be easily adhered to the face of the user, and provide an enhanced usability to the user, and therefore, a screen effect can be enhanced. The face contact part 720 according to various embodiments of the disclosure may be formed of a leaf spring. The leaf spring has an attribute of maintaining the original shape. Accordingly, the face contact part 720 may be manufactured of the material of the leaf spring by forming a metallic plate according to the curved shape. If an external force is applied to the face contact part 720 in an opposite direction to the curved surface, the face contact part 720 may have a reversely folded shape, and if the face contact part 720 is changed to the original shape by an external force, such as a finger of the user, it maintains the original curved shape. Accordingly, the face contact part 720 formed of a leaf spring may be provided with an elastic force for maintaining the curved shape without using the joint structure (e.g., the joint structure 650 of FIG. 6A).

Figure 8:
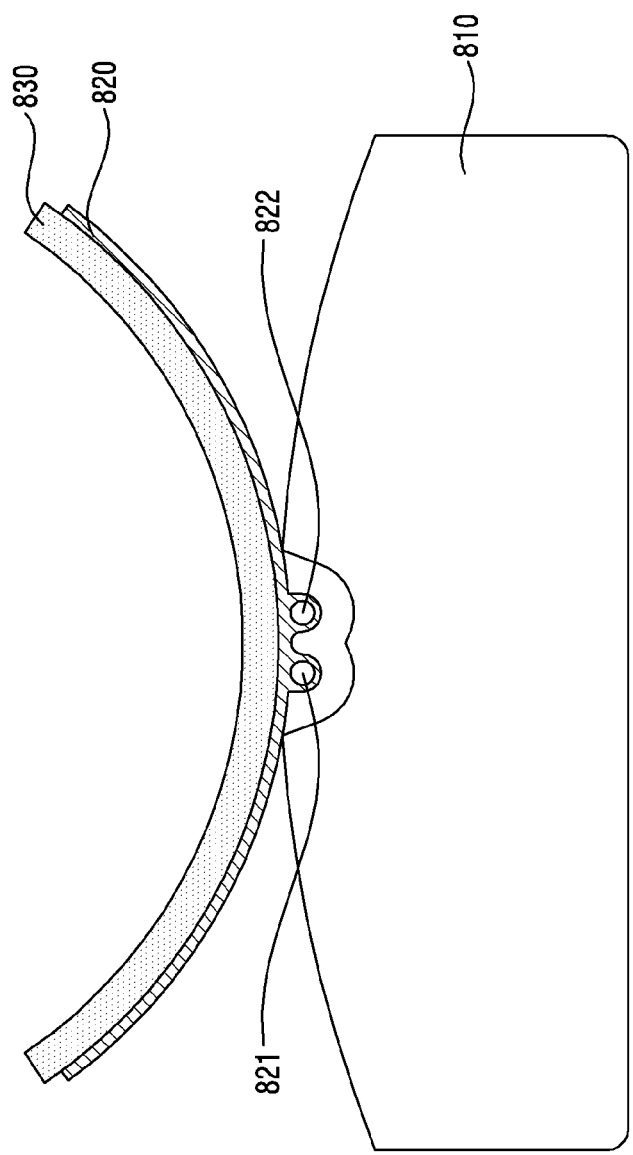
FIG. 8 is a cross-sectional view illustrating an example in which the HMD has two bending axes according to various embodiments of the disclosure.

FIG. 8 is a cross-sectional view illustrating an example in which the HMD has two bending axes according to various embodiments of the disclosure. Referring to FIG. 8, the HMD 800 according to various embodiments of the disclosure may include a housing 810, a face contact part 820, and face foam 830. The face contact part 820 may be integrally formed and be disposed at an intermediate portion of the housing 810 while having a first bending axis 821 and a second bending axis 822. The face contact part 820 may be bent in more various radii when two separate bending axes are provided rather than when one bending axis (e.g., the bending axis 721 of FIG. 7) is provided. Further, the radius of bending may be variously adjusted according to the distance between the first bending axis 821 and the second bending axis 822.

Figure 9A:
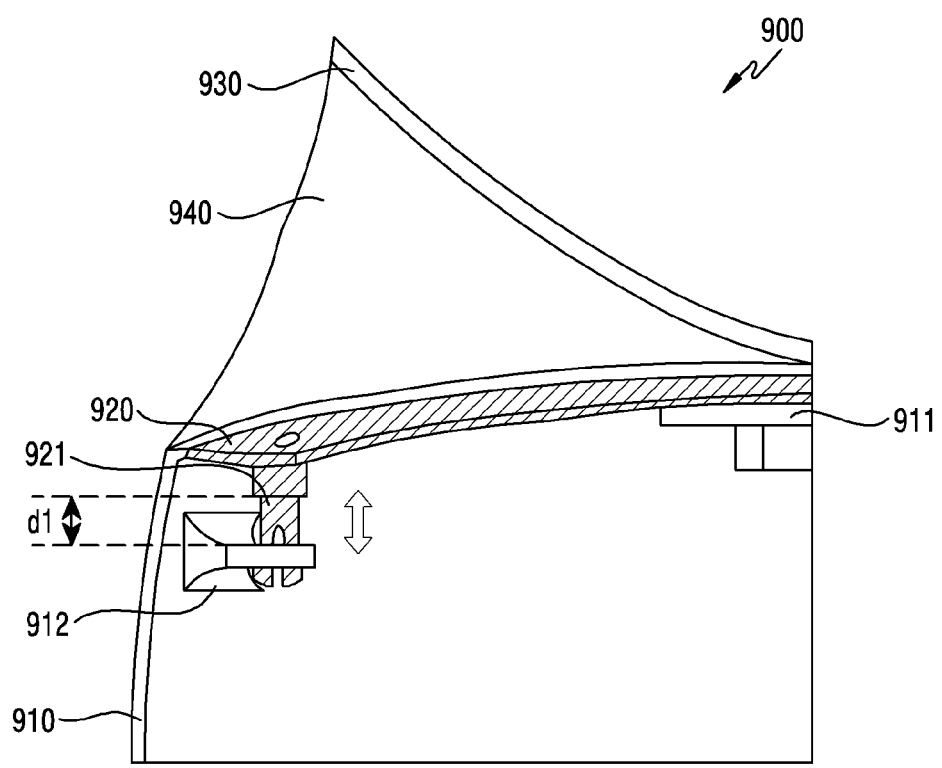
FIG. 9A is a phantom perspective view illustrating an operation of a face contact part-pair member when the HMD is in the first configuration according to various embodiments of the disclosure.
Figure 9B:
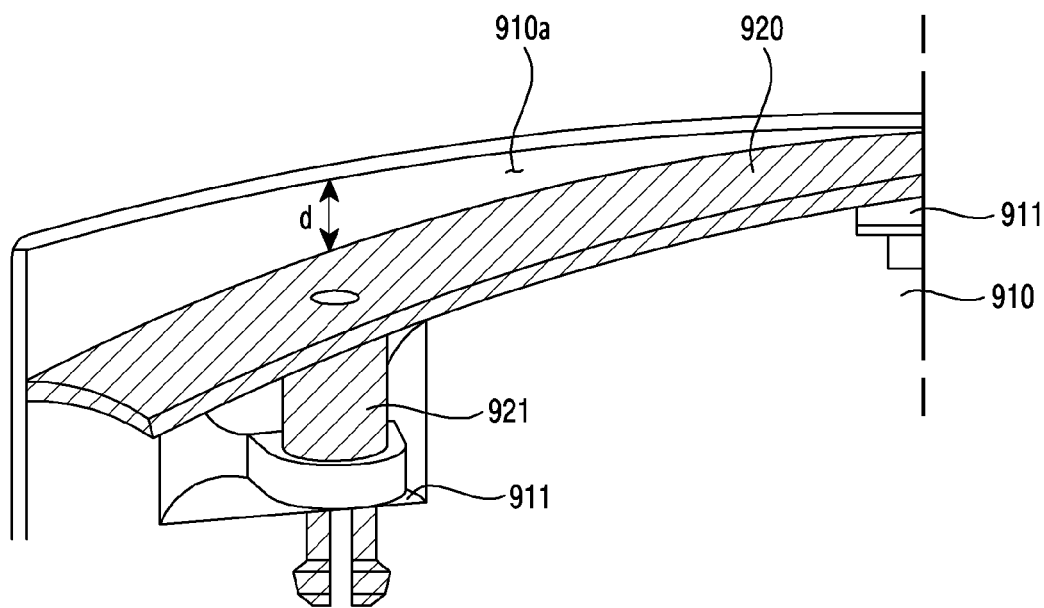
FIG. 9B is a phantom perspective view illustrating an operation of a face contact part-pair member when the HMD is in the second configuration according to various embodiments of the disclosure.

FIG. 9A is a phantom perspective view illustrating an operation of a face contact part-pair member when the HMD is in the first configuration according to various embodiments of the disclosure. FIG. 9B is a phantom perspective view illustrating an operation of a face contact part-pair member when the HMD is in the second configuration according to various embodiments of the disclosure. Referring to FIGS. 9A and 9B, an operation of making a space, into which at least a portion of the light shielding part is inserted as the configuration of the HMD is changed from the first configuration to the second configuration, will be described.

Referring to FIG. 9A, the face contact part-pair member 920 according to various embodiments of the disclosure may be disposed in the interior of the housing 910. The face contact part-pair member 920 may be supported by a support part 911 (e.g., the support part 313 and 314 of FIG. 3A) disposed at an intermediate portion of the housing 910. Further, the face contact part-pair member 920 may include at least one coupling boss 921. The coupling boss 921 may be coupled to a coupling boss accommodating hole 912 disposed on the inner surface of the housing 910 at a location corresponding to the coupling boss 921. Accordingly, the face contact part-pair member 920 may be assembled in the housing 910 such that at least one coupling boss 921 is coupled to the coupling boss accommodating hole 912 of the housing 910 and an intermediate portion of the face contact part-pair member 920 is supported by the support part 911.

According to various embodiments of the disclosure, the diameter of the coupling boss 921 may be smaller than the diameter of the coupling boss accommodating hole 912. However, the diameter of the end of the coupling boss 921 may be larger than the diameter of the coupling boss accommodating hole 912. Accordingly, the coupling boss 921 may linearly move with respect to the coupling boss accommodating hole 912 by a difference dl between the diameter of the coupling boss 921, which is smaller than the diameter of the coupling boss accommodating hole 912, and the diameter of the coupling boss accommodating hole 912. In various embodiments, an end of the coupling boss 921 may be configured to be stopped not to be pushed to the outside of the housing 910 further when an outwardly pushing force is applied by the joint structure (e.g., the joint structure 650 of FIG. 6A).

Referring to FIG. 9B, when the HMD according to various embodiments of the disclosure is in the second configuration, at least a portion of the face contact part-pair member 920 may be inserted into the housing 910. For example, an intermediate portion of the face contact part-pair member 920 may be supported by the support part 911, and a side portion of the face contact part-pair member 920 may be bent and deformed in a direction in which the face contact part-pair member 920 is inserted into the housing 910 by a difference d corresponding to the coupling boss 921. In this case, a reception space 910a between an end of the housing 910 and the face contact part-pair member 920 may be disposed. The reception space 910a may receive the first light shielding member (e.g., the first light shielding member 940 of FIG. 9A) that connects the face contact part-pair member 920 and the face contact part (e.g., the face contact part 930 of FIG. 9A) in the second configuration of the HMD. In various embodiments, the first light shielding member may be formed of a soft fabric material having elasticity and flexibility. Accordingly, the first light shielding member may be folded and received in the reception space 910a as the configuration of the HMD is changed from the first configuration to the second configuration.

Figure 10:
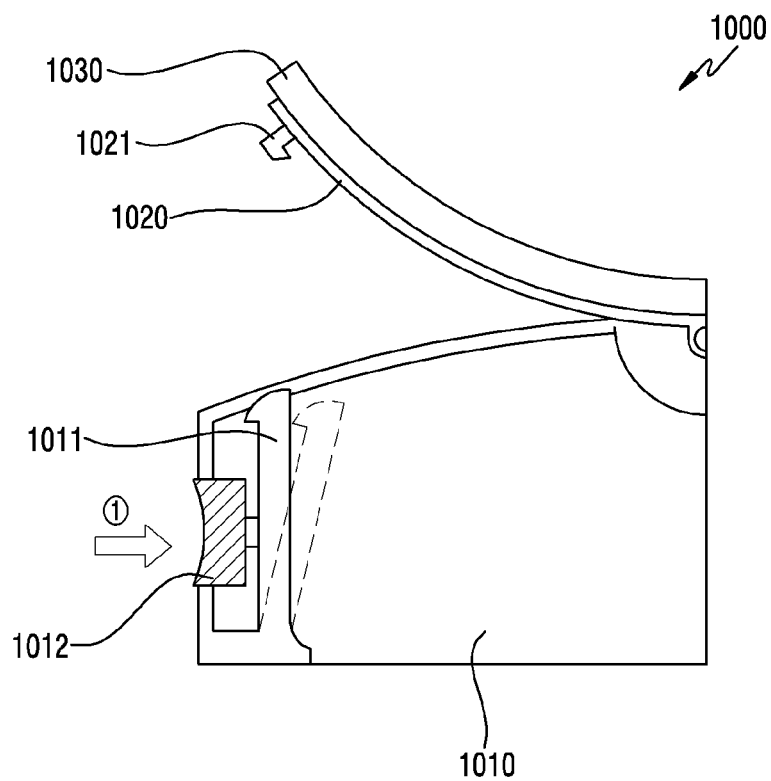
FIG. 10 illustrates an example of a locker of the HMD according to various embodiments of the disclosure.

FIG. 10 illustrates an example of a locker of the HMD according to various embodiments of the disclosure.

Referring to FIG. 10, the HMD 1000 according to various embodiments of the disclosure may include a housing 1010, a face contact part 1020 coupled to the housing 1010 at an intermediate portion thereof, and face foam 1030 disposed on the face contact part 1020. The HMD 1000 may include a locker that may lock a bending operation of the face contact part 1020. The locker, for example, may include a hooking device. The housing may include a first hook 1011 at an end thereof, and the face contact part 1020 may further include a second hook 1021 at a location corresponding to the first hook 1011. The first hook 1011 and the second hook 1021 may be hooked by each other to lock bending and deformation of the face contact part 1020. In other words, the hook structure may confine movement of the face contact part 1020 against an outwardly pushing force provided by the joint structure (e.g., the joint structure 650 of FIG. 6A). The hooking of the first hook 1011 and the second hook 1021 may be released by a button 1012 provided on a side surface of the housing 1010. For example, an opposite end of the first hook 1011 is secured to the housing 1010, and the physical coupling of the first hook 1011 to the second hook 1021 may be released by pressing (in direction) the button 1012 by the user.

Figure 11:
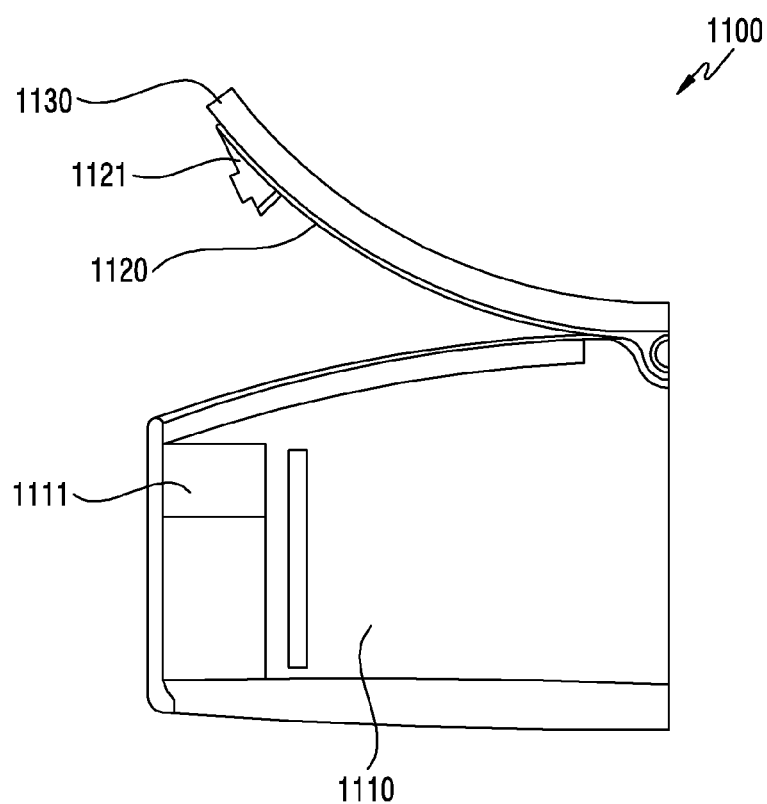
FIG. 11 illustrates another example of the locker of the HMD according to various embodiments of the disclosure.

FIG. 11 illustrates another example of the locker of the HMD according to various embodiments of the disclosure.

Referring to FIG. 10, the HMD 1100 according to various embodiments of the disclosure may include a housing 1110, a face contact part 1120 coupled to the housing 1110 at an intermediate portion thereof, and face foam 1130 disposed on the face contact part 1120. The HMD 1100 may include a locker that may lock a bending operation of the face contact part 1120. The locker, for example, may include a magnetic device. The face contact part 1120 may further include a metallic part 1121 disposed at one end thereof. The housing 1110 may further include a magnetic part 1111 at a location corresponding to the metallic part 1121. The magnetic part 1111 and the metallic part 1121 may be secured to each other by a magnetic force and may lock bending and deformation of the face contact part 1120. In other words, the magnetic device may confine movement of the face contact part 1120 against an outwardly pushing force provided by the joint structure (e.g., the joint structure 650 of FIG. 6A). In another embodiment, the metallic part may be replaced by the magnetic part, and in another embodiment, the locations of the metallic part and the magnetic part may be exchanged. The user may give a force to the magnetic part 1111 and the metallic part 1121 in a direction in which the magnetic part 1111 and the metallic part 1121 are against the magnetic forces thereof to release the magnetic coupling thereof.

Figure 12:
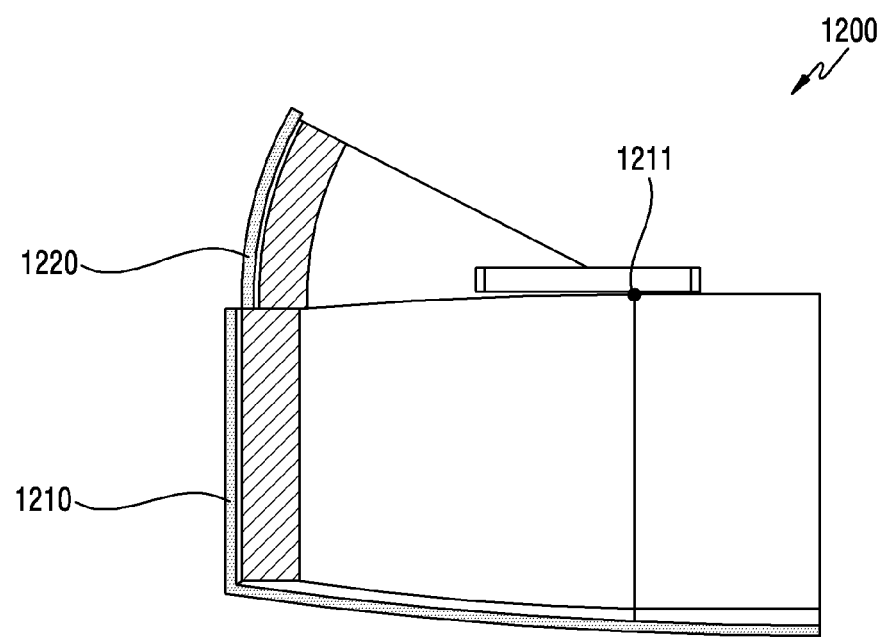
FIG. 12 illustrates the light shielding part of the HMD according to various embodiments of the disclosure.

FIG. 12 illustrates the light shielding part of the HMD according to various embodiments of the disclosure.

Referring to FIG. 12, the light shielding part 1220 of the HMD 1200 according to various embodiments of the disclosure may be configured in a shell type. For example, the light shielding part 1220 rotates about a rotational axis 1211 to be inserted into or extracted from the housing 1210. The shell type light shielding part 1220 may be formed of a material that is similar to that of the housing. In various embodiments, because the outer surface of the light shielding part 1220 has a strength and a texture that are the same as those of the outer surface of the housing 1210, it can contribute to the external unity and the esthetic aspect of the HMD 1200. The HMD 1200 having a shell type may be secured through the method disclosed above, for example, through various structures, such as a magnet, a spring lock, and a hook, and may be released by a physical, electrical, or magnetic button.

Figure 13:
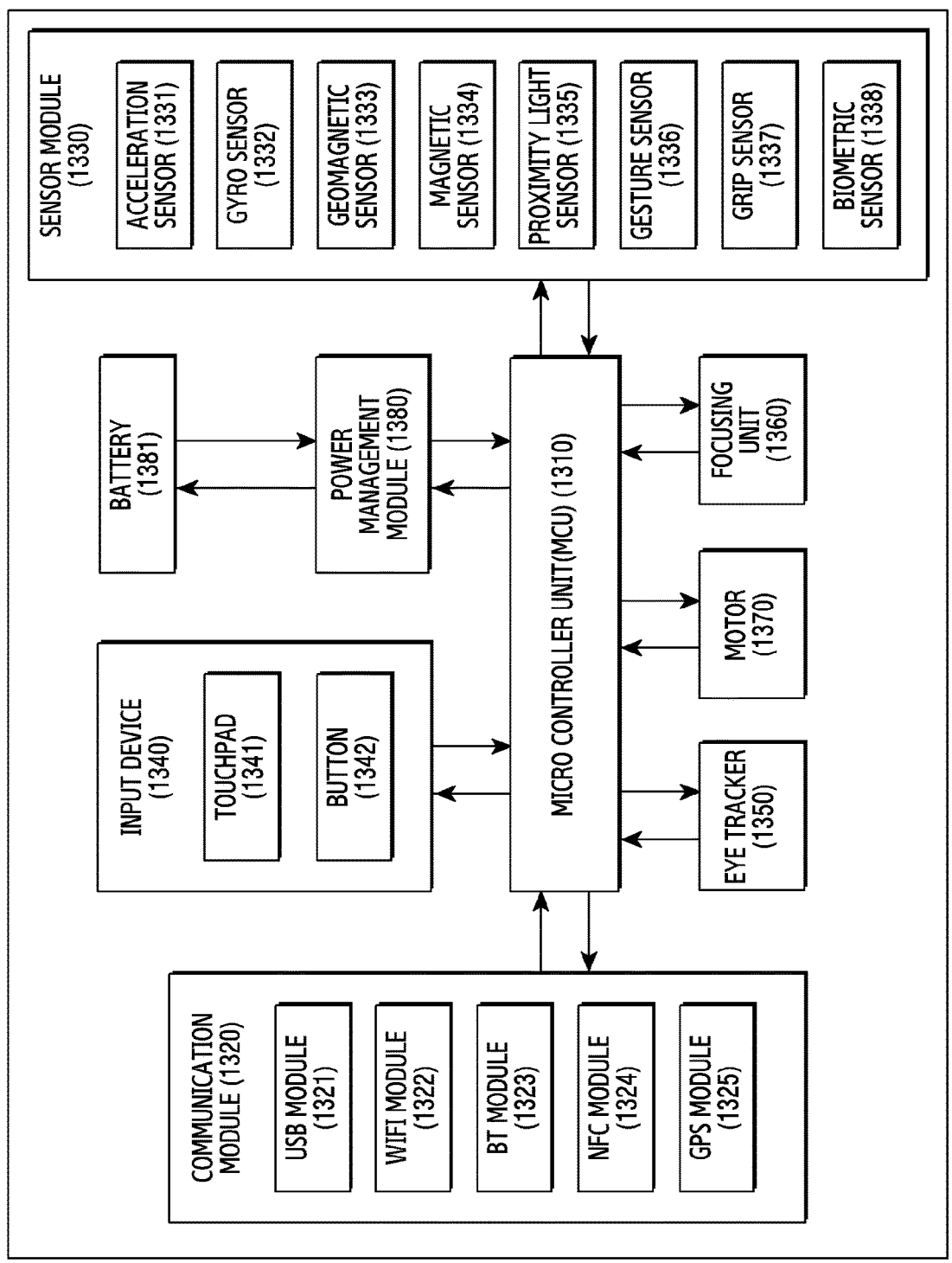
FIG. 13 illustrates a block diagram of a configuration of the HMD according to various embodiments of the disclosure.

FIG. 13 illustrates a block diagram of a configuration of the HMD according to various embodiments of the disclosure.

The HMD 1300 of FIG. 13 may be an example that is similar to or different from the HMD disclosed in FIGS. 1 to 12.

Referring to FIG. 13, the HMD 1300 may include a controller (an MCU) 1310, a communication unit (a communication module) 1320, a sensor unit (a sensor module) 1330, an input unit (an input device) 1340, a power device (a power management module 1380 and a battery 1381), an eye tracker 1350, a motor (a vibrator) 1370, and a focusing unit (an adjustable optics) (or a lens assembly) 1360.

The controller (MCU) 1310 may include, for example, a processor, and may control a plurality of hardware elements connected thereto by driving an operating system (OS) or embedded S/W programs.

The communication unit 1320 may electrically connect the housing and the external electronic device (e.g., the external electronic device 340 of FIG. 3A) by using wired and/or wireless communication to perform data transmission/reception. According to various embodiments of the disclosure, the communication unit 1320 may include a USB module 1321, a Wi-Fi module 1322, a BT module 1323, an NFC module 1324, and/or a GPS module 1325. According to an embodiment, at least some (e.g., two or more) of the Wi-Fi module 1322, the BT module 1323, the NFC module 1324, or the GPS module 1325 may be included in one integrated chip (IC) or an IC package.

The sensor unit 1330 may measure a physical property or sense an operational configuration of the HMD 1300, and may convert the measured or sensed information into an electric signal. The sensor unit 1330, for example, may include at least one of an acceleration sensor 1331, a gyro sensor 1332, a geomagnetic sensor 1333, a magnetic sensor 1334, a proximity light sensor (e.g., a proximity sensor) 1335, a gesture sensor 1336, a grip sensor 1337, or a biometric sensor 148. The motion of the head of the user, on which the HMD 1300 is mounted, may be sensed by using the acceleration sensor 1331, the gyro sensor 1332, or the geomagnetic sensor 1333. It may be sensed by using the proximity light sensor 1335 or the grip sensor whether the HMD 1300 is mounted. According to another embodiment, at least some elements of the sensor unit 1330 may be included in an attachable external electronic device.

According to various embodiments, the sensor unit 1330 may sense whether the user wears the HMD 1300 by using at least one of recognition of an infrared ray (IR), recognition of a pressure, or a change of a capacitance (or a dielectric constant) according to wearing of the HMD 1300.

According to another embodiment, the sensor unit 1330 may sense the configuration of the light shielding part (e.g., the light shielding part 220 of FIG. 2A). In detail, the sensor unit 1330 may sensor whether the light shielding part is inserted into or extracted from the housing. The sensor unit 1330 may be disposed at an arbitrary suitable location at which the sensor unit 1330 may detect insertion and extraction of the light shielding part or the face contact part. For example, the sensor unit 1330 may be disposed at an end of the housing (e.g., the housing 210 of FIG. 2A), and may sense insertion or extraction of the face contact part (e.g., the face contact part 221 of FIG. 2A).

The gesture sensor 1336 may sense a motion of a hand or a finger of the user and may receive the motion as an input operation of the HMD 1300. Additionally or alternatively, the sensor module 1330 may recognize the user's biometric information using a biometric sensor such as, for example, an E-nose sensor, an electromyography (EMG) sensor, an electroencephalogram (EEG) sensor, an electrocardiogram (ECG) sensor, or an iris sensor. The sensor unit 1330 may further include a control circuit for controlling at least one sensor included therein.

The input unit 1340 may include a touchpad 1341 or a button 1342. The touch panel 1341, for example, may recognize a touch input in at least one type among a capacitive type, a resistive type, an infrared type, and an ultrasonic type. Further, the touchpad 1341 may further include a control circuit. The capacitive touch panel, for example, may allow a physical contact or a proximity recognition. The touch panel 1341 may further include a tactile layer. In this case, the touch panel 431 may provide a tactile reaction to the user. The button 1342, for example, may include a physical button, an optical key, or a keypad.

In another embodiment, the input unit 1340 may receive a signal related to the configuration of the light shielding part through an input by the user. The input unit 1340, for example, the touchpad 1341 may receive a signal indicating whether the light shielding part is in the first configuration in which the light shielding part is extracted or the second configuration in which the light shielding part is inserted.

In another embodiment, the input unit 1340 may control the locker (e.g., the locker 360 of FIG. 3A) that grips the light shielding part (e.g., the light shielding part 220 of FIG. 2A) such that the light shielding part is not extracted again when the light shielding part is inserted into the housing. When the user presses the input unit 1340, for example, the physical button 1342, the locker may release the securing of the light shielding part and allow the light shielding part to be extracted.

The eye tracker 1350, for example, may track an eye of the user by using at least one of an electrical oculography (EOG) sensor, a coil system, a dual Purkinje system, a bright pupil system, or a dark pupil system. Further, the eye tracker 1350 may further include a micro camera for tracking an eye.

The focusing unit 1360 may measure an inter-pupil distance (IPD) of the user such that the user may watch an image suitable for his or her eye sight to adjust the distance of the lens and the location of the display. In various embodiments, the focusing unit 1360 may be included in the lens assembly (e.g., the lens assembly 230 of FIG. 2A).

The power management module 1380, for example, may manage power of the HMD 1300. According to various embodiments, the power management module 1380 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like, and additional circuits, for example, a coil loop, a resonance circuit, a rectifier, and the like for wireless charging may be further included. The battery gauge, for example, may measure the residual amount of the battery 1381 and a voltage, current, or temperature while charging. The battery 1381, for example, may include a rechargeable battery and/or a solar battery.

Figure 14:
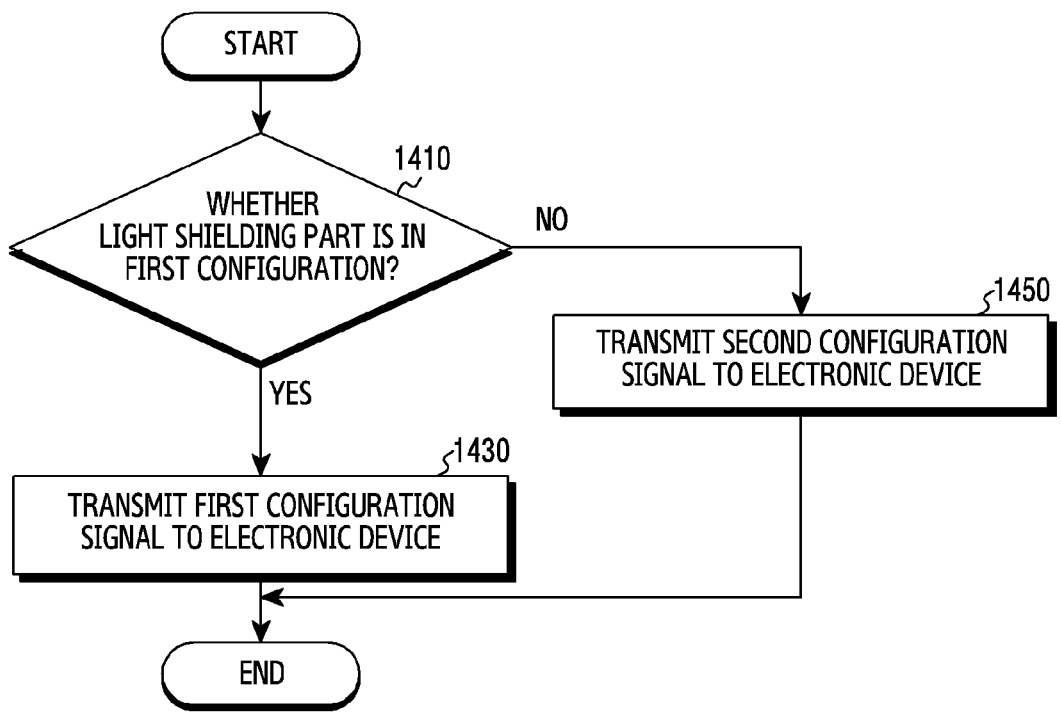
FIG. 14 illustrates an example of an operation of identifying a configuration of the light shielding part by the HMD according to various embodiments of the disclosure.

FIG. 14 illustrates an example of an operation of identifying a configuration of the light shielding part by the HMD according to various embodiments of the disclosure.

Referring to FIG. 14, in operation 1410, the HMD (e.g., the HMD 200 of FIG. 2A) may determine whether the configuration of the light shielding part (e.g., the light shielding part 220 of FIG. 2A) is in the first configuration. The first configuration may be defined as a configuration in which the light shielding part having a screen function is extracted from the housing such that the user uses the HMD. Unlike this, the second configuration may be defined as a configuration in which the light shielding part is inserted into the housing and the user does not use the HMD. In an embodiment, the HMD may determine the configuration of the light shielding part by using the sensor unit (e.g., the sensor unit 1330 of FIG. 13). The sensor unit senses whether at least a portion of the light shielding part is inserted into the housing and may determine the configuration of the light shielding part. According to another embodiment, the HMD may determine the configuration of the light shielding part by using a signal indicating the configuration of the light shielding part, which has been received through the input unit (e.g., the input unit 1340 of FIG. 13).

When it is determined that the configuration of the light shielding unit is the first configuration, the HMD may perform operation 1420. Unlike this, when it is determined that the configuration of the light shielding part is not the first configuration, the HMD may perform operation 1430.

In operation 1420, when the configuration of the light shielding part is the first configuration, the HMD may transmit, to the external electronic device (e.g., the external electronic device 340 of FIG. 3A) a signal indicating that the light shielding part of the HMD is in the first configuration. In an embodiment, the HMD may transmit, to the external electronic device, a signal indicating that the configuration of the light shielding part of the HMD is in the first configuration, through a wired or wireless communication route by using the communication unit (e.g., the communication unit 1320 of FIG. 13).

In operation 1430, when the configuration of the light shielding part is not the first configuration, the HMD may transmit, to the external electronic device, a signal indicating that the light shielding part of the HMD is not the first configuration. Further, a signal indicating that the light shielding part of the HMD is in the second configuration may be transmitted. In an embodiment, the HMD may transmit, to the external electronic device, a signal indicating that the light shielding part of the HMD is in the second configuration, through a wired or wireless communication route by using the communication unit.

Figure 15:
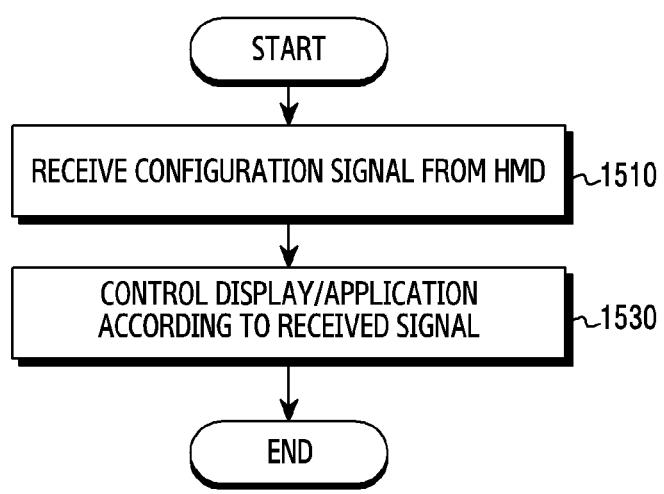
FIG. 15 illustrates an example of an operation of an external electronic device controlled according to a signal received from the HMD according to various embodiments of the disclosure.

FIG. 15 illustrates an example of an operation of an external electronic device controlled according to a signal received from the HMD according to various embodiments of the disclosure.

Referring to FIG. 15, in operation 1510, the electronic device (e.g., the electronic device 340 of FIG. 3A) may receive a signal on the configuration of the light shielding part from the HMD. The electronic device may receive a signal on the configuration of the light shielding part of the HMD through the wired and/or wireless communication route.

In operation 1520, the electronic device may control a display or an application based on a signal on the received configuration of the light receiving state. The external electronic device may determine a current operational state in correspondence to the signal on the configuration of the light shielding part. For example, the external electronic device may determine whether the display is currently in an on configuration or an off configuration. When the display is in an on state and the received signal on the light shielding part indicates the second configuration, the display may be switched off. When the display is in an off state and the received signal on the light shielding part indicates the first configuration, the display may be switched on.

According to another embodiment, the external electronic device may determine whether a virtual reality application is being executed. When it is determined that the virtual reality application is not executed, the external electronic device may execute the virtual reality application if the received signal on the light shielding part indicates the first configuration. Further, when it is determined that the virtual reality application is executed, the external electronic device may complete the virtual reality application if the received signal on the light shielding part indicates the second configuration.

According to another embodiment, the external electronic device may provide a general mode and a virtual reality mode (or a head mounted mode (HMM)) according to the signal on the state of the light shielding part received from the HMD. For example, the external electronic device may convert the mode from the general mode to the virtual reality mode when the received signal on the light shielding part indicates the first configuration. Further, the external electronic device may convert the mode from the virtual reality mode to the general mode when the received signal on the light shielding part indicates the second configuration. In the virtual reality mode, the external electronic device may separate one content into two contents and display the contents through the display. Because the two contents separated and displayed are distorted by two lenses (e.g., the lens 331 of FIG. 3A) included in the HMD, the external electronic device may inversely distort a planar image according to the characteristics of the lenses and may display the inversely distorted image to provide the user with an image that is not distorted. Through this, the user may be provided with virtual reality contents of an environment of 360 degrees.

In another embodiment, the external electronic device may provide a general mode and a see-through mode according to a signal on the configuration of the light shielding part, which is received from the HMD. For example, the external electronic device may convert the mode from the general mode to the see-through mode when the received signal on the light shielding part indicates the first configuration. Further, the external electronic device may convert the mode from the see-through mode to the general mode when the received signal on the light shielding part indicates the second configuration. In the see-through mode, a preview screen of a rear camera (e.g., the imaging device 342 of FIG. 3B) of the external electronic device may be viewed in a partial area of an existing virtual reality screen in the form of a picture-in picture (PIP) form, and the virtual reality screen may be converted into a background, and the camera preview screen may be expanded to the entire area to be viewed. Through this, the user may identify a surrounding environment through an image if necessary while experiencing virtual reality contents of 360 degree.

A head mounted device according to various embodiments of the disclosure may include a housing including an opening, a lens assembly disposed in the opening, and a light shielding part disposed along a circumference of the opening, wherein the light shielding part is configured to have a first configuration in which the light shielding part is extracted from the housing through the opening to be mounted on the face of a user, and a second configuration in which at least a portion of the light shielding part is inserted into the housing through the opening.

According to various embodiments of the disclosure, the light shielding part may include a face contact part formed to have a predetermined width in a shape corresponding to the circumference of the opening, a first light shielding member coupled to an outer circumference of the face contact part to define an outer surface of the head mounted device together with the housing, and a second light shielding member connecting an inner circumference of the face contact part and an outer circumference of the lens assembly to define an inner surface of the head mounted device.

According to various embodiments of the disclosure, an intermediate portion of the face contact part may be secured to an intermediate portion of the housing, and opposite sides of the face contact part with respect to the intermediate portion of the face contact part may be bent and deformed in a direction facing the outside of the housing to have a curved shape in the first configuration, and the opposite sides of the face contact portion with respect to the intermediate portion of the face contact part may be bent and deformed in a direction facing the housing to be secured to the circumference of the opening in the second configuration.

According to various embodiments of the disclosure, the first light shielding member and the second light shielding member may be inserted into or extracted from the housing as the configuration of the head mounted device is changed to the first configuration and the second configuration.

According to various embodiments of the disclosure, the first light shielding member and the second light shielding member of the HMD may be formed of a fabric material.

According to various embodiments of the disclosure, the first light shielding member and the second light shielding member may be formed of a flexible material, and are folded to be inserted into the housing when the configuration of the head mounted device is changed from the first configuration to the second configuration.

According to various embodiments of the disclosure, the light shielding part may further include a face contact part-pair member formed to have a predetermined width in a shape corresponding to the circumference of the opening, and coupled to be movable with respect to the opening by a predetermined length in a direction in which the light shielding part is inserted or extracted, and the first light shielding member may be coupled to the outer circumference of the face contact part, and may be coupled to an outer circumference of the face contact part-pair member to connect the outer circumference of the face contact part and the circumference of the opening.

According to various embodiments of the disclosure, the face contact part-pair member may be configured to move in a direction facing the interior of the opening by a predetermined length to define a space in which the first light shielding member is able to be accommodated, when the configuration of the head mounted device is changed from the first configuration to the second configuration.

According to various embodiments of the disclosure, the head mounted device may further include a joint structure configured to transmit an elastic force in a direction in which opposite sides of the face contact part are extracted with respect to the housing.

According to various embodiments of the disclosure, the joint structure may include a first joint coupled to one end of the face contact part to be hingeable, and a second joint coupled to the lens assembly secured to the interior of the housing to be hingeable in a first axis, and the first joint and the second joint may be coupled to each other to be hingeable in a second axis.

According to various embodiments of the disclosure, the second joint may include a curved portion that surrounds at least a portion of the lens assembly not to interfere with the angle of view of the user who views the lens assembly when rotating in the second axis.

According to various embodiments of the disclosure, the joint structure may include pin springs in the first axis and the second axis, respectively, to provide an elastic force.

According to various embodiments of the disclosure, the housing further may include a locker configured to confine movement of the joint structure against the elastic force such that the head mounted device is maintained in the second configuration.

According to various embodiments of the disclosure, the first joint further may include a protrusion, and the locker may confine the protrusion that moves in a direction in which the protrusion is inserted into or extracted from the opening by a motion of the joint structure.

According to various embodiments of the disclosure, the head mounted device may further include at least one sensor configured to detect whether the opposite sides of the face contact part are secured to the circumference of the opening, a memory including instructions, a communication module, and at least one processor connected to the memory and the communication module, wherein the processor is configured to, when the instructions are executed, determine a configuration of the head mounted device according to the bending/deformation configuration state of the light shielding part by using the at least one sensor, and transmit a signal on the configuration to an external electronic device including a display for displaying virtual reality contents.

According to various embodiments of the disclosure, the display unit may be configured to display contents in a general mode when the signal on the configuration indicates the first configuration, and display contents in a virtual reality mode when the signal on the configuration indicates the second configuration.

According to various embodiments of the disclosure, the face contact part may be formed of a leaf spring and has an internal elastic force that maintains the curved shape.

A head mounted device according to various embodiments of the disclosure may include a housing including an opening, a lens assembly disposed in the opening, and a light shielding part, wherein the light shielding part includes a face adhering part having a shape corresponding to a circumference of the opening and a predetermined width, a first light shielding member connecting an outer circumference of the face adhering part and a circumference of the opening, and a second light shielding member connecting an inner circumference of the face adhering part and an outer circumference of the lens assembly, and wherein the face adhering part is configured to have a curved shape to be mounted on the face of the user in the first configuration, and is configured to be bent and deformed in the curved shape in the second configuration to be secured at the circumference of the opening.

According to various embodiments of the disclosure, the first light shielding member may be configured to define an external appearance of the head mounted device together with an outer surface of the housing in the first configuration or be inserted into the housing in the second configuration, and the second light shielding member may be configured to define an inner surface of the head mounted device in the second configuration or be folded such that at least a portion of the second light shielding member is inserted into the housing in the second configuration.

According to various embodiments of the disclosure, the HMD may further include a joint structure configured to transmit an elastic force in a direction in which opposite sides of the face adhering part are extracted from the housing.

According to various embodiments of the disclosure, the housing may further include a locker configured to confine movement of the joint structure against the elastic force to maintain the second configuration.

The term "module" as used herein may include a unit including hardware, software, or firmware, and may, for example, be used interchangeably with the term "logic", "logical block", "component", "circuit", or the like. The "module" may be an integrated element, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 310), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Various embodiments of the disclosure disclosed in this specification and the drawings are merely specific examples presented in order to easily describe technical details of the disclosure and to help the understanding of the disclosure, and are not intended to limit the scope of the disclosure. Therefore, it should be construed that, in addition to the embodiments disclosed herein, all modifications and changes or modified and changed forms derived from the technical idea of various embodiments of the disclosure fall within the scope of the disclosure.

The invention claimed is:

1. A head mounted device comprising:
a housing including an opening;
a lens assembly disposed in the opening;
a face contact part formed to have a predetermined width in a shape corresponding to a circumference of the opening;
a light shielding part disposed along a circumference of the opening to form a surface of the head mounted device, the light shielding part including a first light shielding member and a second light shielding member, the first light shielding member connecting an outer circumference of the face contact part and the circumference of the opening to form an outer surface of the head mounted device together with the housing, the second light shielding member connecting an inner circumference of the face contact part and an outer circumference of the lens assembly to form an inner surface of the head mounted device; and
a face contact part-pair member disposed along the circumference of the opening to be movable with respect to the opening by a predetermined length in a direction in which the light shielding part is inserted or extracted, the face contact part-pair member being located between the first light shielding member and the second light shielding member,
wherein the light shielding part is configured to have a first configuration in which the light shielding part is extracted from the housing through the opening to be mounted on a face of a user, and a second configuration in which at least a portion of the light shielding part is inserted into the housing through the opening,
wherein the face contact part-pair member is configured to move in a direction facing an interior of the opening by the predetermined length to form a space in which the light shielding part is accommodated, the head mounted device being changed from the first configuration to the second configuration according to the movement of the face contact part-pair member, and wherein the space is not formed in the first configuration and the space is formed during changing from the first configuration to the second configuration by the movement of the face contact part-pair member.

2. The head mounted device of claim 1, wherein an intermediate portion of the face contact part is secured to an intermediate portion of the housing, and
wherein opposite sides of the face contact part with respect to the intermediate portion of the face contact part are bent and deformed in a direction facing an outside of the housing to have a curved shape in the first configuration, and the opposite sides of the face contact part with respect to the intermediate portion of the face contact part are bent and deformed in a direction facing the housing to be secured to the circumference of the opening in the second configuration.

3. The head mounted device of claim 2, wherein the first light shielding member and the second light shielding member are inserted into or extracted from the housing as a configuration of the head mounted device is changed to the first configuration and the second configuration.

4. The head mounted device of claim 3, wherein the first light shielding member and the second light shielding member are formed of a flexible material, and are folded to be inserted into the housing when the configuration of the head mounted device is changed from the first configuration to the second configuration.

5. The head mounted device of claim 3, wherein the light shielding part further comprises:
the face contact part-pair member formed to have a predetermined width in a shape corresponding to the circumference of the opening, and
wherein the first light shielding member is coupled to the outer circumference of the face contact part, and is coupled to an outer circumference of the face contact part-pair member to connect the outer circumference of the face contact part and the circumference of the opening.

6. The head mounted device of claim 3, further comprising:
at least one sensor configured to detect whether the opposite sides of the face contact part are secured to the circumference of the opening;
a memory comprising instructions;
a communication module; and
at least one processor connected to the memory and the communication module,
wherein the processor is configured to, when the instructions are executed:
determine a configuration of the head mounted device according to a bending/deformation configuration state of the light shielding part by using the at least one sensor; and
transmit a signal on the configuration to an external electronic device comprising a display for displaying virtual reality contents.

7. The head mounted device of claim 6, wherein the display is configured to:
display contents in a general mode when the signal on the configuration indicates the first configuration; and
display contents in a virtual reality mode when the signal on the configuration indicates the second configuration.

8. The head mounted device of claim 2, further comprising:
a joint structure configured to transmit an elastic force in a direction in which opposite sides of the face contact part are extracted with respect to the housing.

9. The head mounted device of claim 8, wherein the joint structure comprises:
a first joint coupled to one end of the face contact part to be hingeable; and
a second joint coupled to the lens assembly secured to an interior of the housing to be hingeable in a first axis,
wherein the first joint and the second joint are coupled to each other to be hingeable in a second axis.

10. The head mounted device of claim 9, wherein the second joint comprises a curved portion that surrounds at least a portion of the lens assembly not to interfere with an angle of view of the user who views the lens assembly when rotating in the second axis.

11. The head mounted device of claim 9, wherein the housing further comprises a locker configured to confine movement of the joint structure against the elastic force such that the head mounted device is maintained in the second configuration.

12. The head mounted device of claim 11, wherein the first joint further comprises a protrusion, and
wherein the locker confines the protrusion that moves in a direction in which the protrusion is inserted into or extracted from the opening by a motion of the joint structure.

13. The head mounted device of claim 9, wherein the joint structure comprises pin springs in the first axis and the second axis, respectively, to provide an elastic force.

14. The head mounted device of claim 2, wherein the face contact part is formed of a leaf spring and has an internal elastic force that maintains the curved shape.

15. A head mounted device comprising:
a housing including an opening;
a lens assembly disposed in the opening;
a light shielding part; and
a face contact part-pair member along a circumference of the opening to be movable with respect to the opening by a predetermined length in a direction in which the light shielding part is inserted or extracted,
wherein the light shielding part comprises:
a face adhering part having a shape corresponding to a circumference of the opening and a predetermined width;
a first light shielding member connecting an outer circumference of the face adhering part and the circumference of the opening to form an outer surface of the head mounted device; and
a second light shielding member connecting an inner circumference of the face adhering part and an outer circumference of the lens assembly to form an inner surface of the head mounted device, and
wherein the face adhering part is configured to have a curved shape to be mounted on a face of a user in a first configuration, and is configured to be bent and deformed in the curved shape in a second configuration to be secured at the circumference of the opening,
wherein the face contact part-pair member is configured to move in a direction facing an interior of the opening by the predetermined length to form a space in which the light shielding part is accommodated, the head mounted device being changed from the first configuration to the second configuration according to the movement of the face contact part-pair member, the face contact part-pair member being located between the first light shielding member and the second light shielding member, and
wherein the space is not formed in the first configuration and the space is formed during changing from the first configuration to the second configuration by the movement of the face contact part-pair member.

16. The head mounted device of claim 15, wherein the first light shielding member is configured to define an external appearance of the head mounted device together with an outer surface of the housing in the first configuration or be inserted into the housing in the second configuration, and wherein the second light shielding member is configured to define an inner surface of the head mounted device in the second configuration or be folded such that at least a portion of the second light shielding member is inserted into the housing in the second configuration.

17. The head mounted device of claim 16, further comprising:

a joint structure configured to transmit an elastic force in a direction in which opposite sides of the face adhering part are extracted from the housing.

18. The head mounted device of claim 17, the housing further comprising:

a locker configured to confine movement of the joint structure against the elastic force to maintain the second configuration.

\* \* \* \* \*

UNITED STATES PATENT AND TRADEMARK OFFICE
CERTIFICATE OF CORRECTION

PATENT NO. : 11,500,202 B2
APPLICATION NO. : 16/606733
DATED : November 15, 2022
INVENTOR(S) : Sang Chul Lee et al.

It is certified that error appears in the above-identified patent and that said Letters Patent is hereby corrected as shown below:

On the Title Page

Column 1, Item (72), Line 1, "Sang Chui LEE" should read --Sang Chul LEE--.

Signed and Sealed this
Third Day of January, 2023

Katherine Kelly Vidal
*Director of the United States Patent and Trademark Office*